June 18, 1935.  W. A. LEWIS  2,005,150
CONTINUOUS CARRIER RELAYING
Filed Dec. 22, 1933  5 Sheets-Sheet 3

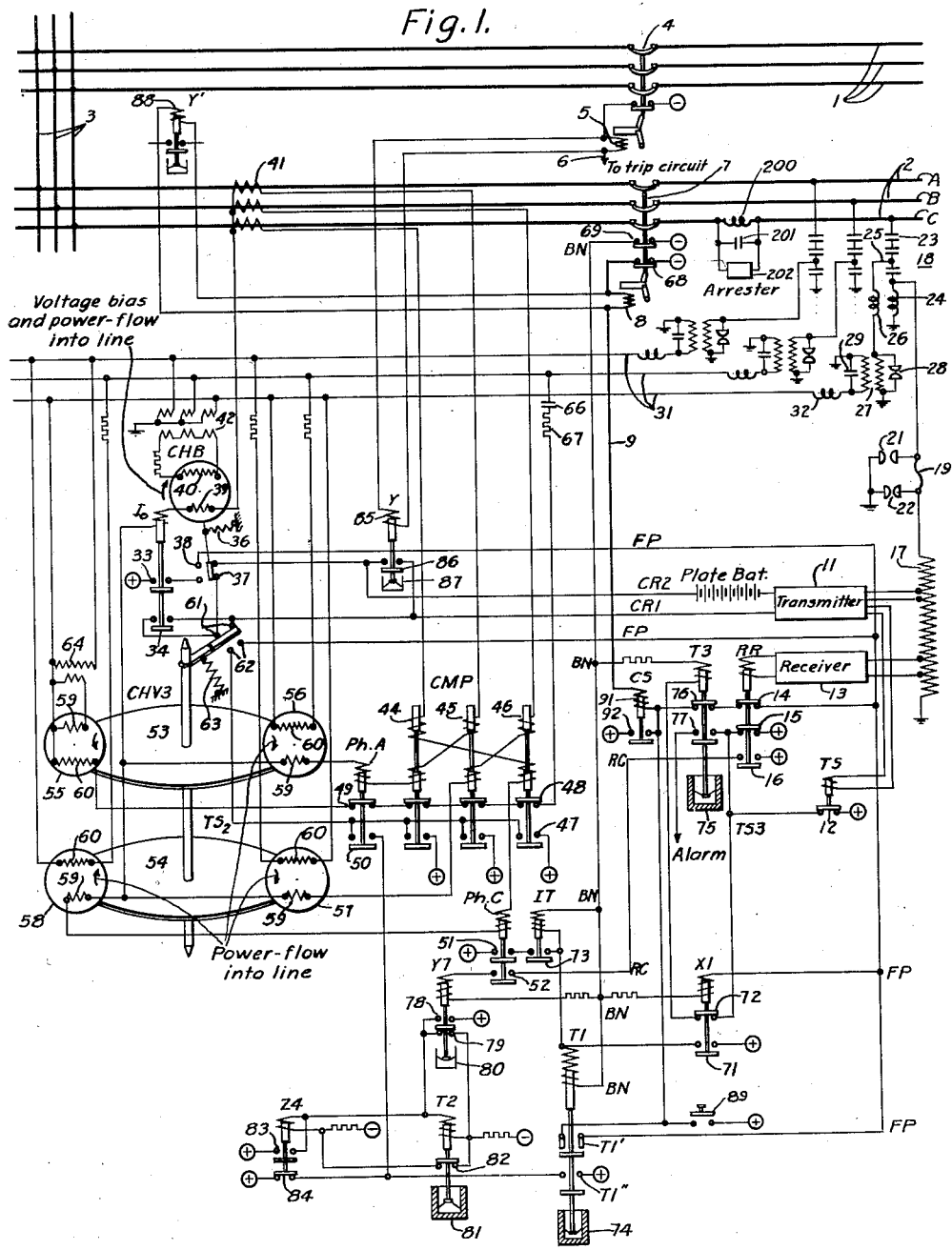

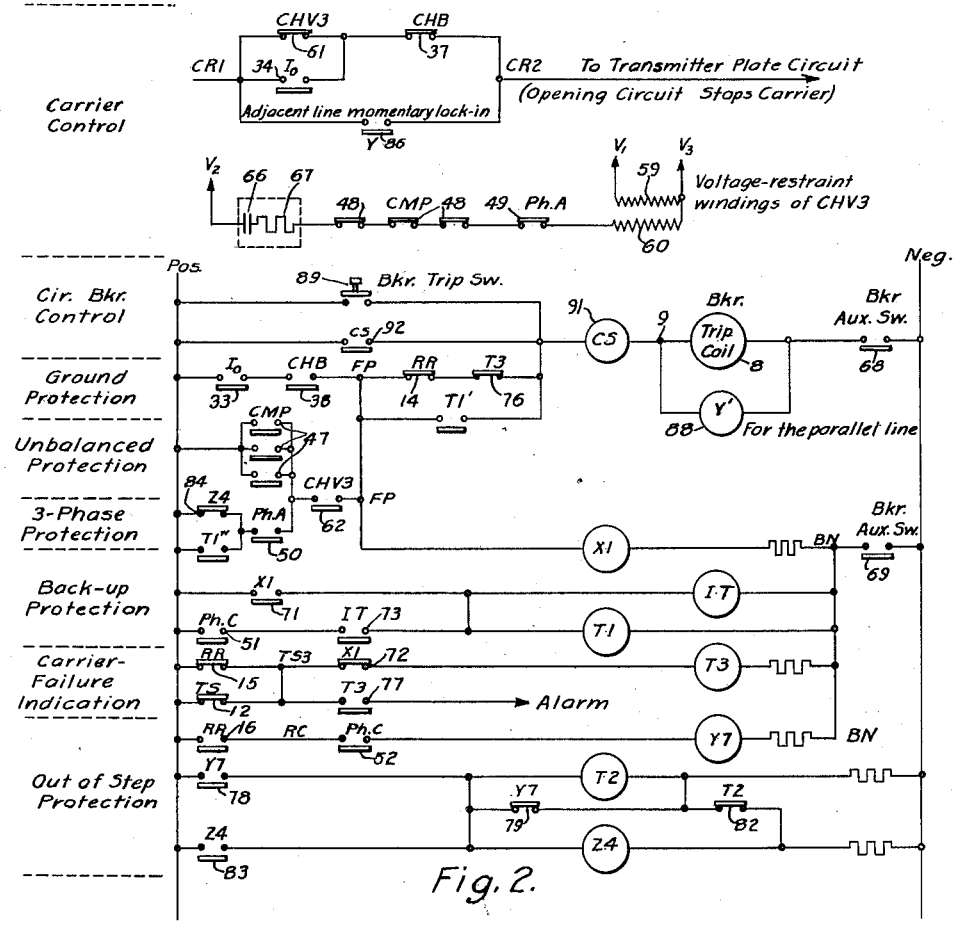

WITNESS

INVENTOR
William A. Lewis
BY
ATTORNEY

June 18, 1935. W. A. LEWIS 2,005,150
CONTINUOUS CARRIER RELAYING
Filed Dec. 22, 1933 5 Sheets-Sheet 5

WITNESS
E. A. McCloskey

INVENTOR
William A. Lewis.
BY O. B. Buchanan
ATTORNEY

Patented June 18, 1935

2,005,150

UNITED STATES PATENT OFFICE 2,005,150

CONTINUOUS CARRIER RELAYING

William A. Lewis, Wilkinsburg, Pa., assignor to Westinghouse Electric & Manufacturing Company, East Pittsburgh, Pa., a corporation of Pennsylvania Application December 22, 1933, Serial No. 703,607

45 Claims. (Cl. 175—294)

This invention relates to means for making the continuous carrier relaying system for transmission-line protection practical, and it has particular relation to means for getting the carrier current off of the line, so as to make it possible for the tripping function to be performed, under conditions of low delta-phase voltage or high residual voltage accompanied in either case by low current.

The expression "continuous carrier relaying" is utilized in contradistinction to "intermittent carrier relaying", an example of which is shown in Fig. 8 of the Scott Patent 1,765,887, patented June 24, 1930. In the continuous carrier relaying system, the carrier current is left on the line at all times except when there is a fault in the line-section being protected, at which time the carrier current must be removed from both ends of the line in order to permit instantaneous tripping. In the intermittent carrier relaying system there is normally no carrier-current superposed on the line, but in the event of a fault accompanied by power-flow from the line to the bus at either end, carrier-current is suddenly superposed on the line for the purpose of preventing tripping at the other end, the tripping relays being given a suitable time-hesitation or sluggishness of action, of about three cycles, in order to give the carrier-current relays time to inhibit the tripping action if the fault is not in the line-section being protected. Both relaying systems utilize, or may utilize, carrier-current transmitters of the same frequency at each end of the line-section being protected.

Heretofore, one of the principal objections against the continuous carrier system, which has helped to lend weight to the intermittent carrier system in spite of the inherent time-hesitation necessarily introduced in every operation of the latter, has been the circumstance that it is possible for the transmission system to be so operated, at times, that there is no adequate source for supplying power to one end of the line-section to be protected, in which case, there will be insufficient fault-current to properly actuate the relays at that end, so as to remove the carrier current from that end of the line. This condition of operation of a transmission system may be brought about by a disconnection in the transmission line at some point possibly several sections removed from the section being protected, and this disconnection may be made in either a multi-circuit transmission system or in a loop system.

My present invention provides means for overcoming this difficulty, while correctly operating for normal transmission conditions in which there is an adequate source of power at both ends.

With the foregoing and other objects in view, the invention consists in the systems, combinations, apparatus and methods hereinafter described and claimed and shown in the accompanying drawings, wherein Figure 1 is a diagrammatic view of circuits and apparatus embodying my invention in an illustrative form;

Fig. 2 is a corresponding schematic or across-the-line diagram of the same system;

Figs. 3 and 4 are single-line diagrams referred to in the explanation of the operation;

Figure 5:
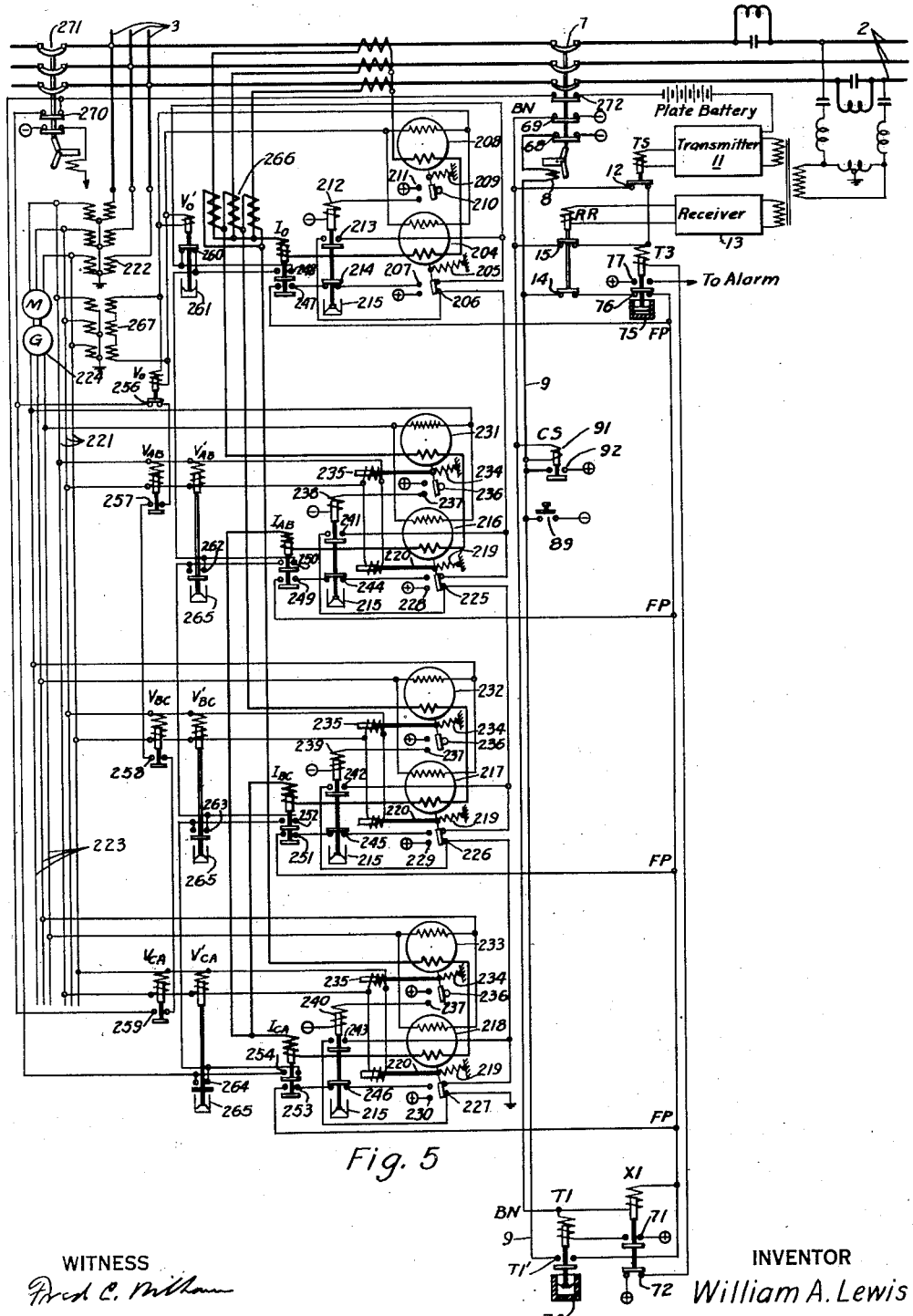
Figs. 5 and 6 are views similar to Figs. 1 and 2, showing a modification.

The invention is illustrated in Figs. 1 and 2 in application to a double-circuit transmission system comprising two three-phase lines 1, 2, connected to a common bus 3. The relaying equipment is shown in detail for only one end of the line 2, but as both ends of both lines are substantially identical, one illustration and description will suffice for all. The line 1 is provided with a circuit breaker 4 having a trip coil 5 which is energized from a suitable trip circuit 6 not shown in detail, the same being substantially equivalent to the trip circuit which is shown and hereinafter described, for the other line 2.

The line 2 is provided with a circuit breaker 7 having a trip coil 8 and a trip-circuit conductor 9, the control of which embodies the means forming the subject matter of the present invention.

The line 2 has superposed thereon carrier currents of relatively high frequency, as a means for securing selective instantaneous tripping for all faults in the line-section to be protected. This carrier current is produced, at each end of the line-section, in a transmitter 11 which is indicated schematically by a rectangle, as the details of it are not necessary to an understanding of the present invention. It may be a transmitter similar to that which is shown in the application of William A Lewis and Robert D. Evans, Serial No. 660,342, filed March 11, 1933, for Protective relay systems. The transmitter is provided with a plate circuit CR1—CR2, the opening of which instantly interrupts the transmission. The transmitter is also provided with a transmitter supervisory relay TS having back-or break-contacts 12 which are opened when the relay is energized and made when the relay is deenergized, as described and claimed in the Lewis and Evans application just mentioned.

The carrier-current equipment at each end of the line 2 also includes a receiver 13 which is indicated only schematically, but it may be substantially as shown and described in the aforementioned Lewis and Evans application. The receiver 13 serves to energize a receiver relay RR having two back-or break-contacts 14 and 15 and one front-or make-contact 16, the break-contacts 14 and 15 being opened when the receiver relay RR is energized, and the make-contact 16 being closed when the receiver relay RR is energized.

The transmitter and receiver 11 and 13 are coupled to phase-conductor C of the transmission line 2 by means of tap connections on an inductor or autotransformer 17, and a combined coupling capacitor and capacitor-potentiometer designated in its entirety by the numeral 18, which constitutes the subject-matter of an application of Paul O. Langguth and William A. Lewis, Serial No. 703,608, filed December 22, 1933, for a Coupling capacitor system.

Interposed between the inductor 17 and the coupling device 18 is a fuse 19, the terminals of which are connected to ground through gap devices 21 and 22. Gap 22, which is connected to the terminal of the inductor 17, is set closer than gap 21 so that, in case a high voltage should reach the coupling lead, the gap 22 would discharge first and divert the surge to ground. In case of power current following the discharge, the rush of current through the fuse 19 to this gap 22 would blow the fuse. Upon the blowing of the fuse 19 the voltage across the other gap 21 would then rise to a value sufficient to discharge this other gap, thus permitting the fuse to clear, and isolating the carrier-current equipment. The arc across the gap 21 may continue until it is cleared by the circuit breakers at the ends of the line.

The carrier-current equipment is illustrated as being connected from the phase-C conductor of the line, to ground.

The coupling-capacitor equipment includes a string of capacitors 23 which are connected between the phase-C conductor and a drain coil 24, the other terminal of which is grounded, the carrier-frequency coupling connection being made between the drain coil and the last capacitor unit of the string 23. The same capacitor string is utilized as a capacitor-potentiometer which is tapped off at an intermediate point 25, from which a circuit is led through a choke coil 26 to a potential transformer 27 which is protected by a gap device 28. The secondary circuit of the potential transformer is, or may be, shunted by a capacitor 29 which aids in the adjustment of the secondary voltage and also improves the voltage regulation of the device.

It will be understood that all three phases of the line 2 are provided with capacitor voltage equipments 18 similar to that just described for phase C, except that the carrier-current connection is utilized only in phase C. By this means, potential is supplied for a three-phase relaying-voltage line 31, the three conductors of which are connected to the respective secondary circuits of the potential transformers 27 through inductors 32, respectively, which provide tuned relaying-voltage circuits so as to compensate for the phase-angle displacement across the capacitor unit or units between the intermediate tap 25 and ground.

The relaying equipment utilized in the system illustrated comprises the following elements.

An *instantaneous ground overcurrent relay* $I_0$.—This relay has two make-contacts 33 and 34.

An *instantaneous ground directional relay* CHB.—This may be either of the induction-disc type or of the galvanometer type, the latter constituted the subject-matter of a Goldsborough Patent 1,934,664, patented November 7, 1933. This ground directional relay is provided with two torques, both tending to operate the relay against the pull of a light restraining spring 36. One torque is a voltage-bias torque produced by voltage alone, and the other torque is a power-directional torque produced by the product of ground current and residual voltage multiplied by the sine of some predetermined angle plus the angle existing between the ground current and the residual voltage. The voltage torque is strong enough to actuate the relay when the residual voltage exceeds a predetermined value, but it is not so strong that it will overcome the directional torque whenever a current exceeding the minimum operating point of the overcurrent element $I_0$ is flowing in the reverse direction. The ground directional element CHB is provided with one break-contact 37 and one make-contact 38. It is provided with a current winding 39 and a voltage winding 40, which are energized, respectively, from the neutral circuits of a set of line-current transformers 41 and a residual potential transformer 42.

An *instantaneous unbalanced-current relay* CMP.—This relay consists of three mechanically independent elements 44, 45 and 46 each having a current-responsive actuating coil and a current-responsive restraining coil, so that each element responds to the difference between two of the line-currents supplied by the current transformers 41. Each of the three elements of the instantaneous unbalanced-current relay CMP has one make-contact 47 and one break-contact 48.

*Two instantaneous phase overcurrent relays* Ph. A and Ph. C.—The Ph. A relay is energized from the phase-A line-current supplied by the current transformer 41, and is provided with one break-contact 49 and one make-contact 50. The Ph. C element is energized in accordance with the phase-C line-current that is supplied by the current transformer 41. This relay element is provided with two make-contacts 51 and 52 respectively.

An *instantaneous phase directional relay* CHV3.—This relay is composed of four torque-producing elements mechanically coupled together, so that the torques add algebraically. Each torque-producing element may be of either the induction-disc type or the galvanometer type, as previously explained in connection with the ground directional relay CHB. For convenience of illustration, the instantaneous phase directional relay CHV3 is shown as comprising two discs 53 and 54 which are operated on by four magnetic elements 55, 56, 57 and 58 of a common watt-meter type, each comprising a heavy, current-winding 59 and a voltage-winding 60. The instantaneous phase directional relay CHV3 is provided with break-contacts 61 and make-contacts 62, and it is also provided with a light actuating spring 63 which tends to actuate the relay into a position in which the break-contacts 61 are opened and the make-contacts 62 are closed.

The instantaneous phase directional relay

CHV3 is normally held against the operation of the spring 63, so that the break-contacts 61 are normally closed, as illustrated, and the make-contacts 62 are normally open, as illustrated, by means of voltage restraint which is provided by the wattmeter element 55. The current coil 59 of this element is energized in accordance with the phase-AC voltage of the voltage-supply line 31, by means of a suitable step-down transformer 64 for the purpose of converting from the high-voltage, low-current supply characteristic of a voltage coil, to the high-current, low-voltage supply characteristic of a current coil. The current coil 59 is utilized because of its much better space factor than is obtainable with a voltage coil, this being due to the fact that a current coil consists of a large conductor having only a few turns and very light insulation, so that much less space is taken by insulation, relative to the space occupied by copper, when a current coil is utilized. This makes it possible to utilize a smaller wattmeter element 55 than would be the case if it were provided with two voltage coils instead of one voltage coil and one current coil.

The voltage coil 60 of the voltage-restraint wattmeter element 55 is energized in accordance with the phase-BC voltage of the voltage-supply conductors 31, in series with the break-contact 49 of the instantaneous phase overcurrent relay Ph. A and the three break-contacts 48 of the instantaneous unbalanced-current relay CMP, all connected in series, and it may be connected also in series with an external impedance device which may consist of a capacitor 66 and a resistor 67 which introduces a factor equal to the sine of the angle $\phi$ between the phase-AC and phase-BC voltages, so that sin $\phi$ becomes zero when the phase-AB voltage collapses.

The voltage-restraint torque produced by the wattmeter element 55 is thus the product of three factors, namely, the phase-AC voltage, the phase-BC voltage and the phase-AB voltage, so that the voltage-restraint is proportional to the area of the delta-voltage triangle of the line-voltages, and becomes zero whenever any one of these three delta-voltages becomes zero.

The power-directional torques produced by the three other wattmeter elements 56, 57 and 58 of the instantaneous phase directional relay CHV3 are all in a direction to actuate the relay so as to open the break-contacts 61 and close the make-contacts 62, when power is flowing into the line in the corresponding phase, A, B or C thereof, as will be readily understood from the connections illustrated. The wattmeter element 56, for instance, has its current coil 59 energized in accordance with the phase-A line-current as supplied by the current transformer 41, and it has its voltage element 60 energized in accordance with the phase-BC line-voltage as supplied by the voltage-supply line 31.

In addition to the foregoing equipment, the following auxiliary elements are utilized.

*Two auxiliary switches 68 and 69 carried by the circuit breaker 7.*—These are closed when the circuit breaker is closed and open when the circuit breaker is open. The auxiliary switch 68 is in series with the trip coil 8 so as to open the latter when the circuit breaker is open. The auxiliary switch 69 is connected between the negative bus and an auxiliary breaker-position-responsive negative bus BN, to which some of the hereinafter-mentioned auxiliary relaying equipment is connected.

*An instantaneous auxiliary relay X1.*—It is energized whenever there is an indication of current of fault-magnitude, and a direction of power-flow from the bus 3 into the line 2. It has one make-contact 71 and one break-contact 72.

*An instantaneous auxiliary relay IT.*—This is an instantaneous element associated with the back-up timer T1, about to be described. It has one make-contact 73.

*A back-up timer T1.*—This is arranged to move slowly in the actuating direction, and to return to its initial position promptly, as is indicated in the showing of a dashpot 74 connected to this timer relay T1. It has two make-contacts T1' and T1'', of which the former may be so disposed that the contacts are made before the T1'' contacts are made, although this difference in time is not essential, as will be hereinafter pointed out in the explanations of the circuit-connections and operation of the device.

*A carrier-failure timer T3.*—This is provided with a dashpot 75 or any equivalent means for producing a slow pick-up response. It is provided with one break-contact 76 and one make-contact 77.

*An auxiliary relay Y7.*—This has one make-contact 78 and one break-contact 79. It preferably has a slow pick-up of the order of three cycles of the line-frequency, or more, as indicated by the light dashpot 80 thereon, although this time delay is not vitally necessary, as will be explained in connection with the explanation of the operation hereinafter.

*An out-of-step time lock-out relay T2.*—It has a drop-out time long enough to allow the two ends of the line-section to pass through their out-of-phase condition while the line-losses are being supplied by both ends, this drop-out time being possibly of the order of 10 or 15 cycles to a second, as will be subsequently described, and being obtained by means of a dashpot 81 or any other timing means. This time lock-out relay T2 is provided with one break-contact 82.

*An out-of-step auxiliary relay Z4.*—This has one make-contact 83 and one break-contact 84.

*An auxiliary carrier-maintaining relay Y.*—This has its operating coil 85 energized either in parallel or series with the trip coil 5 of the circuit breaker 4 for the parallel line 1, the parallel connection being shown, that is, the relay coil 85 being connected in parallel to the trip coil 5. This relay has one make-contact 86. It is provided with any suitable means for giving it a short hesitation of about three cycles in its drop-out time, as indicated by the light dashpot 87. The drawings also show the corresponding relay Y' for the parallel line 1, the same having its operating coil 88 connected in parallel to the trip coil 8 of the circuit breaker 7 for the line 2.

*A tripping push button 89*

*A contactor CS.*—This is for the purpose of by-passing the light relay-contacts which initially energize the trip-coil circuit 9, so as to prevent damage due to the heavy tripping current. This contactor CS has its operating coil 91 connected in series with the trip coil 8 of the circuit breaker and it has one make-contact 92 which seals-in the contactor and keeps the trip circuit 9 energized until the current is finally interrupted by the auxiliary switch 68 on the breaker.

The circuit connections of the above-described equipment are all shown in Fig. 1 and are summarized also in the schematic diagram of Fig. 2, which may be referred to for convenience in tracing out the operation of the apparatus.

Normally the instantaneous unbalanced-current relay CMP and the instantaneous overcurrent relay Ph. A are in the deenergized position, with their back contacts 48 and 49 closed, thus maintaining voltage restraint on the phase directional relay CHV3 at each end of the line-section 2. The voltage restraint is sufficient to overcome the action of the relay spring 63 and to prevent the power-directional torques produced by normal loads from operating said relay CHV3, so that the relay contacts 61 and 62 are normally in the positions shown.

Similarly, the ground directional relay CHB is normally deenergized by reason of the absence of residual power, as is also the ground overcurrent relay $I_0$, so that the contacts of these relays are also in the positions shown, and this holds true for both ends of the line-section 2.

Reference to the top of Fig. 2 will show that these conditions normally maintain the plate circuit CR1—CR2 of the transmitter 11 at each end of the line, and keeps the carrier current on the line.

Reference to the "ground protection" trip circuit in Fig. 2 will show that the normally instantaneous trip circuit includes the ground-overcurrent-relay make-contact 33 and the ground-directional-relay make-contact 38 in series, so that both of these contacts must be closed before either one can energize an auxiliary fault-responsive positive bus FP.

The remainder of the trip circuit includes the receiver-relay break-contact 14 and the carrier-failure-timer break-contact 76 in series, from which the circuit is continued to the coil of the contactor CS and thence to the trip-circuit conductor 9, the trip coil 8, and the auxiliary breaker-switch 68 to the negative terminal.

As shown in Fig. 2 under the subject of "Unbalanced protection", the auxiliary fault-responsive positive bus FP may also be energized by the closure of any one of the make-contacts 47 of the unbalanced-current relay CMP, the three make-contacts 47 being connected in parallel to each other and in series with the make-contact 62 of the phase directional relay CHV3. It will be understood that it is necessary for the phase-directional-relay make-contact 62 to be closed before the auxiliary fault-responsive positive bus FP is energized by the actuation of any one of the three elements comprising the unbalanced-current relay CMP.

In Fig. 2, under the head of "Three-phase protection", a circuit is also provided from the positive bus through the break-contact 84 of the auxiliary out-of-step relay Z4, in series with the Ph. A make-contact 50, thence to the CHV3 make-contact 62. The out-of-step relay contact 84 of the relay Z4 is shunted by the make-contact T1'' of the back-up timer T1.

Under normal conditions, the receiver relay RR at each end of the line-section 2 is energized, so that its break-contact 14 is open, thereby interrupting the trip circuit, independently of the condition of the relay contacts interposed between the positive bus and the auxiliary fault-responsive positive bus FP.

When there is a fault involving ground, the instantaneous ground overcurrent relays $I_0$ in the line-sections adjacent to the fault will operate, closing the make-contacts 33 and 34. The make-contact 34 by-passes the phase directional break-contacts 61, thus giving preference to the ground relays in the control of the carrier current. This preference is desirable because load power may flow past a single line-to-ground fault, to a load beyond the fault, in sufficient amount to overbalance the torque due to the fault current, thus making it possible for one or more of the phase directional relays CHV3 which are located at various points on the system to give an incorrect indication of the fault direction under this condition. Thus, if this ground-fault preference is not inserted by the ground-current-responsive make-contact 34, the improper opening of one of the phase directional relay contacts 61 in any line-section would result in the interruption of the transmission of carrier current at a point where it should be maintained in order to provide correct relaying.

The improper operation of the phase-directional relay CHV3 is permitted by reason of the fact that a high value of ground current in one phase may actuate one or more of the Ph. A or CMP relay elements in series with the voltage-restraint winding 60 and remove the voltage restraint from the phase directional relay, allowing it to be operated by the load power, and if the fault is not in the line-section in question, the load power will be flowing into the line at one end and out of the line at the other, so that improper operation will be obtained at one end.

In case a ground fault occurs on the protected line-section 2, the ground overcurrent relays $I_0$ will be operated at both ends of the section. The ground directional relays CHB will also be operated at both ends, thus opening the plate circuits of the carrier-current transmitters and stopping transmission at both ends. This causes the receiver relays RR at both ends to be deenergized, thus closing their break-contacts 14 and completing the trip-circuits through the contacts 33 and 38 of the ground overcurrent relay $I_0$ and the ground directional relay CHB at each end of the line.

If the fault involves more than one conductor and the ground fault-current is insufficient to operate the ground overcurrent relay $I_0$, the control of the carrier-current transmission resides in the phase directional relay CHV3. If the fault is in the protected line-section 2, the phase directional relay CHV3 at each end of the section will interrupt the transmission of carrier current, this relay being now free to operate because of the removal of voltage restraint by reason of the low voltage due to the fault itself or by reason of the removal of all voltage restraint by the actuation of the Ph. A relay or one of the CMP relay elements. As soon as carrier is removed from both ends of the line-section, the receiver relay RR at each end will be deenergized, closing its break-contact 14 and completing the trip circuit, in this case, through the contact 62 of the phase directional relay and the contacts 47 or 50 of the unbalanced current relay CMP or the Ph. A relay, according as the fault is an unbalanced fault or a three-phase fault.

Under some extreme conditions of system operation, as pointed out at the outset of this specification, it may happen that the fault currents flowing to the fault from one end of the line will be insufficient to operate the overcurrent relays at that end, until after the circuit breaker at the opposite end has opened. In order to permit instantaneous tripping at said opposite end, however, it is necessary that the transmission of carrier current be interrupted at both ends. This is accomplished at the end carrying the small current as follows, in accordance with the present invention.

In case the fault is a single line-to-ground fault, the polyphase voltage will always be distorted, so that there will be sufficient residual voltage to produce a voltage-bias in the ground directional relay CHB which will overcome the restraining spring 36 and operate the relay, under conditions when there is little or no ground current and hence little or no power-directional torque in either direction. The ground directional relay will, therefore, be operated by residual-voltage bias, because the ground current is small, and the back contact 37 will be opened under this condition, thereby interrupting the carrier-current transmission. At the opposite end of the line there will necessarily be ground current as well as residual voltage, so that the apparatus will perform in the usual manner, as previously described, and the tripping will occur at that end as soon as the receiver-relay contact 14 closes. As soon as the circuit breaker opens, clearing the fault at the end carrying the fault current, the current at the end which originally carried the small amount of fault current will usually rise above the tripping value and tripping will follow immediately.

If the fault involves more than one conductor, one or more of the phases of the delta voltage at the end carrying the small current will be reduced to a low value, thereby removing the voltage-restraint from the phase directional relay CHV3, and this relay will be operated by its spring 63, aided by the slight power-directional torque produced by the small value of fault-current. The operation of this relay opens the contact 61 and since the ground current is small, the ground overcurrent relay contact 34 will remain open, so that the transmitter plate circuit will be interrupted, thus interrupting the operatioin of the carrier-current transmitter at that station. In other respects, the clearing of such faults is similar to the clearing of the ground faults just discussed.

In the case of an external ground fault producing ground current flowing in the direction from the bus 3 into the line 2, but where the fault is located externally of the line-section 2, the ground directional relay CHB at the bus 3 will be actuated, opening its contact 37 and interrupting the transmitter plate circuit, thus interrupting the operation of the carrier-current transmitter 11 at that station. At the other end of the line-section 2, however, the ground power-flow will be from the line to the bus, so that the ground directional relay CHB at that station will not be actuated, the torque being in the direction to keep its normally closed contacts 37 closed more tightly, so that the carrier-current transmission at this station will be maintained. Therefore, the receiver relays RR will remain energized at both stations and will keep the trip circuits open at the relay contact 14 at both stations.

In the case of a multi-conductor fault at the same location, which does not involve ground or in which the ground current is so small that the ground overcurrent relay $I_0$ is not actuated, the operation will be as follows. At the station shown in the drawings, fault power flowing from the bus 3 into the line 2 will cause the operation of the phase directional relay CHV3 in the normal manner, and since the ground overcurrent relay $I_0$ is not actuated, the opening of the phase directional relay contact 61 will interrupt the transmitter plate circuit and thus interrupt the carrier-current transmitter at this station, but the carrier-current transmssion will be maintained at the station at the other end of the line-section 2, so as to prevent tripping.

In case of external faults outside of the line section 2 but in such direction that the fault power is flowing from the line into the bus 3, the operation will be the same as described above, except that the stations at the two ends of the line-section 2 will be interchanged in the description.

Out-of-synchronism conditions have, in times past, presented a difficulty, in any kind of pilot relaying, whether utilizing continuous carrier, intermittent carrier, or pilot wires, because, at one or more points in the transmission system, which are called electrical centers, it may appear that power is flowing into these points just as if there were a three-phase fault at each of these points, so that any relaying system responsive to three-phase faults would respond to such out-of-synchronism conditions so as to trip out the line-sections containing these electrical centers of the distribution system. In the relaying system shown in the drawings, means have been provided for affording out-of-step protection, and preventing faulty relaying operations under these conditions. Said means, and the method of operation involved thereby, constitutes the subject matter of an application of William A. Lewis, Serial No. 703,606, filed December 22, 1933 for "Out-of-step protection". In order to make the description of the entire relaying system complete in this application, the following description of the out-of-step protection is included.

During the early stages of out-of-step operation, the two ends of each line-section begin gradually to swing apart in phase, increasing the phase-angle between the two ends until exact phase opposition is reached at 180° and then on through to 360°, and then repeating the cycle, requiring a time which may be of the order of a second or several seconds to complete a cycle, dependent upon the system-constants and the operating conditions of the system.

Out-of-synchronism conditions are recognized by the fact that, during the early stages, power flows through each line-section from one end to the other in a manner similar to an external fault, the current increasing from load-magnitude to fault-magnitude as loss of synchronism is approached. As the power-sources feeding the two ends of the line-section reach approximate phase-opposition, there will be no change in power-flow in those sections which do not contain an electrical center.

But where an electrical center of the system falls in any particular line-section, there will be a brief period in the out-of-synchronism cycle of the transmission system, lasting from just before until just after the approximate 180° phase position is reached, when the losses of the line are being supplied at both ends of the line-section, so that power of fault-magnitude flows into such a line-section from both ends, thus momentarily simulating an internal three-phase fault. This is a condition of unstable equilibrium and will not be maintained, returning again to a through-power condition, with power flowing in at one end and out at the other end of the line-section, soon after the condition of exact phase-opposition is past, so that if the tripping sequence of the three-phase fault-responsive devices is momentarily opened by a time-delay relay energized before the condition of phase-opposition is reached, tripping will be prevented.

In the illustrated relaying system, as the two sources pull out of synchronism, power flows through the relayed section 2 at the same time that current of fault-magnitude is approached. Under this condition, the voltage restraint is removed from the phase directional relay CHV3, and carrier is removed from the end where power flows into the section. At the other end of the section, however, power is flowing out, and consequently carrier is maintained at that end. This condition is recognized by the continuance of a three-phase overcurrent for a time long enough for the fault to have been cleared, wherever it was, if the overcurrent had been caused by a fault anywhere on the system.

Referring to Fig. 2, under the heading of "Out-of-step protection", it will be noted that a relay Y7 is provided, having a slightly delayed pick-up action, so that it will be actuated if the receiver relay RR remains energized, so that the RR contact 16 stays closed, for a predetermined time after an overcurrent condition exists, as indicated by the picking-up of the overcurrent relay Ph. C which closes its contact 52. The time-hesitation in the pick-up of the relay Y7 need be only of the order of two or three cycles of the fundamental line frequency, or slightly more, so that if the overcurrent condition arose as a result of an internal fault in the protected line-section, tripping could occur, as will be subsequently pointed out. It will be observed that the energizing circuit of the relay Y7 extends from the positive bus, through the receiver-relay contact 16, to the conductor RC, thence to the Ph. C relay-contact 52 and the operating coil of the relay Y7, to the auxiliary breaker-position-responsive negative bus BN which is connected to the negative bus by the breaker auxiliary switch 69 as long as the breaker remains closed.

As soon as the out-of-step relay Y7 picks up, it closes its contact 78 and thus completes a circuit from the positive bus to the operating coils of both the out-of-step time lock-out relay T2 and the auxiliary out-of-step relay Z4. The energization of the relay Z4 immediately closes a holding circuit through the Z4 relay-contact 83, by-passing the Y7 relay-contact 78. The relay Z4 also interrupts the three-phase fault-responsive tripping circuit by reason of the opening of the Z4 relay-contact 84. The Z4 relay pick-up time, from the first energization of the Y7 coil, that is, from the first actuation of the overcurrent relays Ph.A and Ph.C, must be longer than it would take to close the trip contact 92 of the contactor CS in case of a three-phase fault, which may be of the order of two cycles.

The out-of-step timing relay T2 is of the instantaneous pick-up type, with time-delay reset. Its actuating coil is by-passed by the Y7 relay-contact 79 which closes when the Y7 relay is deenergized. The T2 relay has a back-contact 82 which closes after a predetermined time-delay upon the deenergization of the relay T2, and the circuits are such that when the back-contacts 79 and 82 of both Y7 and T2 are closed the actuating coil of the Z4 relay will be short-circuited, thus deenergizing the latter, reclosing the Z4 back-contact 84 in the tripping circuit, and opening the Z4 holding-circuit at 83.

If there is not an electrical center in the line-section 2 being protected, the receiver-relay front-contact 16 will remain closed throughout the out-of-synchronism condition, and the overcurrent relay Ph.C contact 52 will remain closed until near the end of the out-of-synchronism cycle, when the two sources at the two ends of the line will again approach in-phase position. As the two sources vary in speed, they will change successively from in-phase position to out-of-phase position, resulting respectively in the alternate deenergization and energization of the Y7 relay, following the slip frequency. There is no need for out-of-step protection under these circumstances, because we have assumed a line-section in which there is no electrical center and hence in which there is never a condition of the simultaneous flowing of power of fault-magnitude into both ends of the line-section.

If an electrical center of the transmission system should fall within the line-section 2 being protected, there will be a brief time, near the condition of exact phase-opposition of the two sources, when power of fault-magnitude will flow into both ends of the line-section, thus operating both of the phase directional relays CHV3 and interrupting carrier-current transmission at both ends, so that each of the receiver relays RR is deenergized. The deenergization of the receiver relay RR opens its contact 16 and deenergizes the Y7 relay, thus short-circuiting the energizing coil of the T2 relay by the closure of the Y7-relay back-contact 79.

The T2 relay then starts to drop out, and its drop-out time (plus the Y7 relay drop-out time) must be of the order of 10 or 15 cycles to a second, or long enough to permit riding over that portion of the out-of-step cycle in which the relaying conditions are similar to an internal three-phase fault, or until the phase directional relays CHV3 at the two ends of the line-section again register an external fault, that is, with one of the relays registering power flowing into the line and the other registering power flowing out of the line, thus restoring carrier-current transmission to one end of the line, picking up the receiver relays RR at both ends of the line. At this time, the Y7 relay is again energized, thus removing its short-circuit 79 from the operating coil of the T2 timing relay, and permitting the latter relay to move its back-contact 82 wide open before it had had time to become closed. The T2 timing relay will thus be kept in its energized position, and its back-contact 82 will not close during the out-of-synchronism condition. As long as the T2-relay back-contact 82 does not close, the Z4 relay will remain energized and will, in turn, prevent tripping by reason of its open back-contact 84 in the tripping circuit of the three-phase fault-responsive device.

It is recognized that an out-of-step condition may simulate a three-phase fault not involving grounds and that, therefore, the unbalanced-current fault-responsive relay, as well as the ground protection, will not be involved. Reference to Figs. 1 and 2 of the drawings will show that the Z4 relay-contact 84 is in series with only that portion of the tripping circuit which is responsive to three-phase faults. It does not interfere with the response to unbalanced phase faults or ground faults. Thus, if either a ground fault or an unbalanced phase fault should occur during out-of-synchronism conditions, the fault will be cleared instantly just as if the out-of-synchronism condition did not exist. If a three-phase fault should occur during out-of-synchronism conditions, it cannot be cleared until the T2 timer closes its back contact 82, thereby short-circuiting the operating coil of the Z4 relay and closing the back-contact 84 of the latter. This would involve the time-delay which is inherent in the drop-out time of the T2 timing relay.

It will now be appreciated why the Y7 relay should have a somewhat slow pick-up of at least two or three cycles, or why the overall pick-up time of the Z4 relay, from the beginning of the energization of the Y7 coil, must be of the order of two or three cycles, or longer than it takes to close the trip contacts 92 of the contactor CS in case of a three-phase fault, which is of the order of two cycles. This is so, because as soon as the Z4 relay picks up, its back-contact 84 opens and prevents tripping as a result of a three-phase fault.

The relaying system shown in the drawings also provides for back-up protection. Referring to Fig. 2, under the heading of "Back-up Protection" it will be noted that the X1 relay coil is energized whenever the energization of the auxiliary fault-responsive positive bus FP indicates the presence of a fault with fault-power flowing from the bus 3 into the line 2. The energization of the operating coil of the X1 relay is completed from the FP bus, through this X1 coil, to the auxiliary negative bus BN.

Whenever there is current of fault-magnitude, accompanied by fault power-direction from the bus to the line, whether the fault is an internal fault within the line-section 2, or an external fault outside of it, the X1 relay will be energized, and its front-contact 71 will energize the operating coils of both the back-up timer T1 and its instantaneous auxiliary relay IT. The front contact 73 of the instantaneous relay IT will complete a holding circuit for the relay IT and the timer T1, provided that it is a three-phase fault which actuated the X1 relay, as indicated by the energization of the Ph.C relay, resulting in the closure of the Ph.C relay-contact 51. This holding circuit 51—73 is necessary in order to maintain the energization of the T1 timer even after the interruption of the energization of the fault-responsive relay X1, because such an interruption of X1 may be brought about by the actuation of the relay Z4 of the out-of-step protective system. By this means, the timer T1 will remain energized after the energization of the out-of-step protective elements.

Thus, if there were a three-phase fault in the second line-section, that is, in the line-section to the right of the right-hand end of the line-section 2 shown in the drawings, the operation of the back-up protective features on the line 2 would not be cut-off by the Z4 out-of-synchronism relay.

The back-up-timer T1 is set to have a time of operation long enough to permit normal tripping in the second section, for example, if the fault is in the second section, whether the fault is a ground fault, an unbalanced fault, or a three-phase fault. This time will include both the relay time and the necessary circuit-breaker time, it being understood that quick-acting circuit breakers as quick as three cycles or even less, may be utilized. If the fault is not cleared in a predetermined time which is longer than that necessary for it to be cleared if the relaying equipment is operating properly, the back-up timer T1 will close its first contact T1' which by-passes the circuit containing the receiver-relay back-contact 14 and the carrier-failure-timer back-contact 76, so that tripping will be effected even though carrier current is not removed from the line, that is, even though the receiver relay RR remains energized, with its back-contact 14 open.

At the close of the pick-up movement of the back-up timer T1, it closes its second contact T1", which by-passes the Z4 contact 84 of the out-of-step protection, and makes it possible to clear a three-phase fault through the back-up tripping contacts T1" and T1'. The time-delay in the closure of the T1" contact may be very great, of the order of several seconds or even minutes, in order to insure that the circuit breaker 7 is not tripped during the continuance of any possible or probable out-of-synchronism condition. No such great time-delay is necessary, however, in the back-up protection for faults involving grounds or unbalanced currents, and hence the T1' back-up timer contacts may close in a much shorter time, merely long enough to permit the fault to be cleared by some other circuit breaker, if it is going to be cleared at all, before the operation of the back-up timer contact T1' makes it possible to clear the fault by means of the circuit breaker 7 which is being controlled.

An important advantage of the continuous carrier system over the intermittent carrier system is that the continuous carrier system may readily embody means for quickly indicating any fault in the carrier-current apparatus, whether transmitter or receiver, as soon as it occurs, whereas, in an intermittent carrier system, such a fault may not become evident until an occasion arises for putting the carrier onto the line in order to prevent tripping, in which case its failure will result in a faulty tripping operation, which is the first notice which the station-operator has of the carrier-current failure. The carrier-failure indication shown in the drawings is similar to that which is shown and covered in the previously mentioned Lewis and Evans application Serial No. 660,342.

Referring to Fig. 2 of the accompanying drawings, under the heading of "Carrier Failure Indication", it will be noted that a circuit is completed from the positive bus to a conductor marked TS3 upon the deenergization of either the receiver relay RR or the transmitter supervisory relay TS, closing their back contacts 15 and 12 respectively. If, at the same time that the TS3 conductor is energized, there is not a fault on the line-side of the bus 3, the X1 relay will not be energized, and the back-contact 72 of the latter will be closed, completing a circuit from the TS3 conductor to the operating coil of the carrier-failure timer T3, from which the circuit is completed to the auxiliary negative bus BN. After a suitable time-delay, which is longer than the longest tripping time of the back-up protection, the carrier-failure timer T3 will complete its pick-up movement and will close its front-contact 77, completing a circuit from the TS3 conductor to an alarm, at the same time opening its back-contact 76 in the tripping circuit, thus permanently locking out the receiver-relay tripping-contact 14 and thereafter permitting tripping only as a result of the back-up protection afforded by the T1' contact, until the station-attendant, aroused by the alarm, has had time to discover and correct the cause of the carrier-failure.

The illustrated protective relay system includes another feature which is designed to afford protection in the event of a sudden reversal of fault-current in a sound line when the line breakers at the two ends of a faulty line do not open simultaneously. This condition will be made clear by reference to the single-line diagrams of Figs. 3 and 4, wherein a transmission system is shown involving a source S, feeding a bus 3 which, in turn, feeds line-sections 1 and 2 through circuit breakers 4 and 7 respectively. The opposite ends of the line-sections 1 and 2 are connected to a bus 101 through circuit breakers 102 and 103 respectively, and the bus 101 is, in turn, connected to additional line-sections 104 and 105 through breakers 106 and 107. The far ends of the line-sections 104 and 105 are connected eventually to a second source S'.

Referring to Fig. 3, if a fault occurs at X, near the far end of the parallel line-section 1, the fault-power will flow in the direction shown by the arrows. It will be noted that the power-flow is from the busses 3 and 101, respectively, into the faulty line 1, at both ends, so that carrier is removed from both ends, and instantaneous tripping is permitted. In the sound line 2, however, the fault-power is flowing from the bus 3 into the line, thus removing carrier from that end of the line, but the fault-power is flowing from the line to the bus 101 at the other end, thus maintaining carrier at that end and preventing the tripping of the brakers 7 and 103 as the two ends of the sound line 2.

In the faulty line 1, the tripping circuits of the two circuit breakers 4 and 102 will be substantially simultaneously energized, so that both breakers begin arcing at substantially the same time, but it is almost inevitable that the breaker carrying the heavier current, which would generally be the breaker 102 closest to the fault, would cease arcing a half-cycle or more ahead of the other breaker, or that one breaker would cease arcing in one of its poles before its other poles, so that there would or might be a sudden reversal of fault-current in the sound line.

Thus, if the breaker 102 opens before the breaker 4 in the faulty line, the conditions will be as depicted in Fig. 4. It will be noted, from the arrows, that the current has reversed at both ends of the sound line 2. This means that the far end containing the breaker 103, which was at first maintaining the carrier, so as to prevent tripping, will, if nothing is done to prevent it, stop transmitting carrier as soon as either one of its directional relays CHB or CHV3 backs off of its back-contact 37 or 61, as the case may be. However, at the near end of the sound line 2, where the circuit breaker 7 is located, the directional element CHB or CHV3 which has responded to the fault-power-flow shown in Fig. 3, has moved to the extreme limit of its travel, with its back-contact 37 or 61, as the case may be, wide open, and it has to move much further than the corresponding relay at the far end where the circuit breaker 103 is, before the previously open back-contact can be reclosed, thus restoring carrier. It is almost inevitable, therefore, that there will be a half-cycle or several half-cycles during which carrier will be removed from the sound line 2, thus permitting the tripping of this sound line which should be avoided by all means, if at all possible, because such faulty tripping would be very likely to cause a serious interruption in service.

Means for overcoming this difficulty constitute the subjects-matter of an application of Robert D. Evans and William A. Lewis, Ser. No. 703,605, filed December 22, 1933, for a Relaying system with directional indication storage, and an application of Roy M. Smith, Ser. No. 703,610, filed December 22, 1933, for Continuous carrier relaying. Both of the applications just mentioned are directed particularly to the problems of continuous carrier-current relaying. Some of the general principles of preventing faulty operation as the result of non-simultaneous operation of breakers or of the different poles of a polyphase breaker are also covered in an application of Edward H. Klemmer, Ser. No. 703,609, filed December 22, 1933, for Relaying systems. The particular means shown in the drawings of the present application for overcoming this reversed-power difficulty in continuous carrier current relaying systems is that which is shown and claimed in the Smith application.

Referring to Figs. 1 and 2 of the accompanying drawings, it will be seen that the carrier-current-transmission is protected by an auxiliary relay Y, the operating coil 85 of which is energized whenever the tripping circuit of the breaker 4 in the parallel line 1 is energized, or, in other words, upon the energization of any tripping circuit of any circuit breaker attached to the bus 3, other than the circuit breaker 7 which is being controlled. The auxiliary relay Y is provided with a make-contact 86 which by-passes all of the relay contacts which might open-circuit the transmitter plate circuit of the transmitter 11, thereby insuring the maintenance of carrier-current transmission on the line 2. This Y relay may be provided with means, symbolized by the light dashpot 87, for causing it to delay two or four cycles in its drop-out, so as to introduce that much time-hesitation in the carrier-current tripping functions of the sound line 2 after the opening of the circuit breaker 4 in the faulty line 1 under the conditions previously outlined. In the normal operation of the protective equipment for the line 2, the auxiliary relay Y will not be involved, because its operating coil 85 will not be energized in response to a fault involving power-flow from the bus 3 into the line 2.

As is customary in carrier current relaying systems, a suitable carrier-frequency trap is utilized in the phase-conductor or conductors to which the carrier is coupled. In the particular form of embodiment shown in the drawings, this trap consists of an inductance coil 200 shunted by a capacitor 201 and a lightning arrester 202.

As previously pointed out, the essential feature of the present invention is the provision of means, in a continuous carrier-current system, for removing carrier-current from the line when a fault is fed from only one end, that is, when there is no substantial fault-current at the end in question. The previously described apparatus has been designed to accomplish the purpose of responding as if there had been a material fault-current flowing into the line, in the event of a voltage-indication of fault in the absence of current. This was accomplished, in the case of the ground directional relay CHB, by providing a voltage-bias for producing a torque responsive to the voltage alone, and strong enough to overcome the restraining spring 36 in case there was no ground-current. In the case of the phase directional relay CHV3, I have provided an actuating spring 63 which will actuate the relay in case the voltage-restraint is removed and in case there is no corresponding current to produce a controlling power-directional torque.

Other means may obviously be utilized to accomplish the same result.

Figure 6:
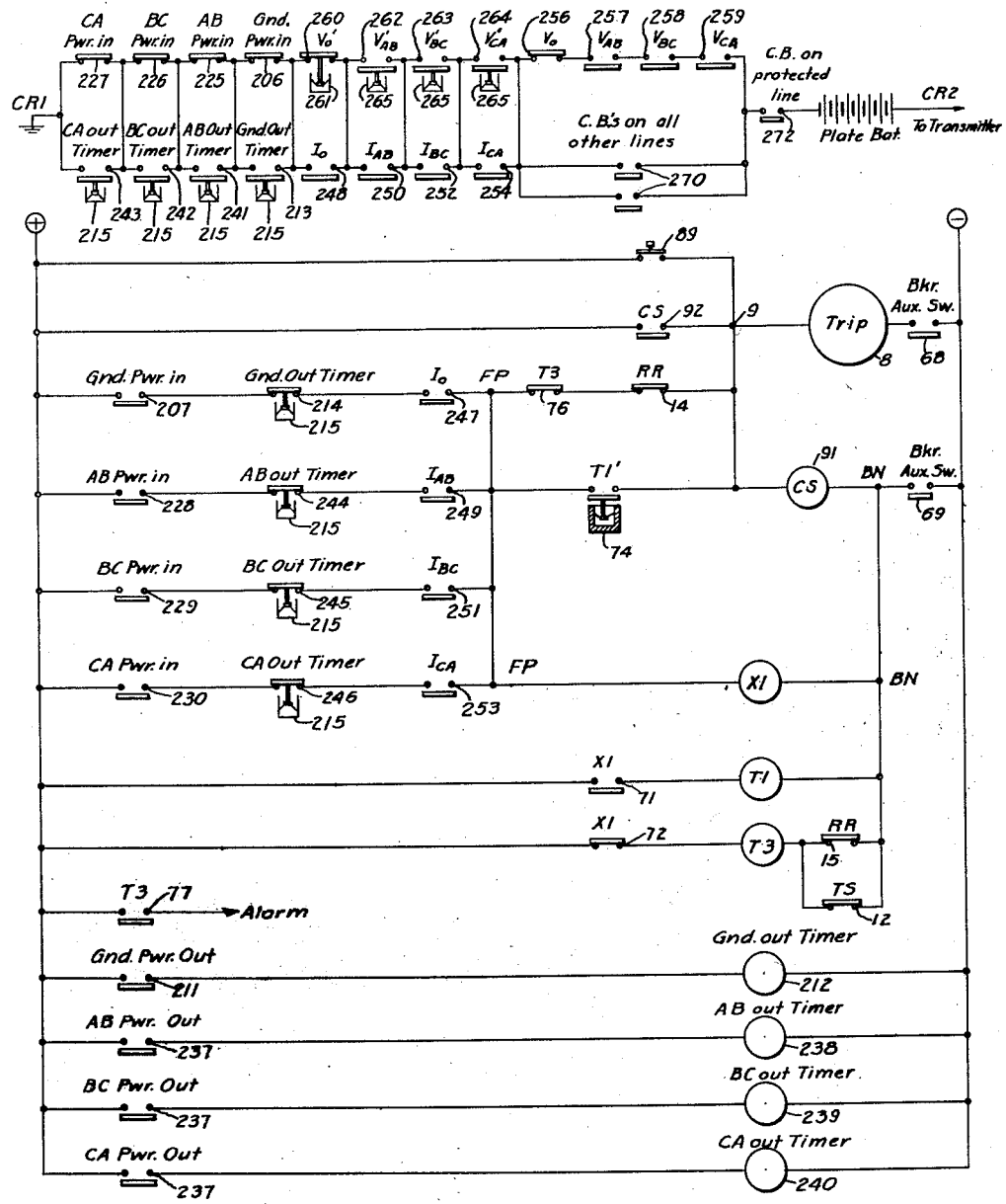

Thus, in Figs. 5 and 6, I have illustrated a relaying system in which the directional relays will respond only in case there is a fault-current, the same being designed so that they will not respond at all to load-power conditions or to low-voltage conditions unaccompanied by fault-current. I then provide separate means, apart from the directional elements, for interrupting the transmitter plate-circuit in the event of a voltage-indication of fault which is not accompanied by a corresponding fault-current.

Figs. 5 and 6 also include other modifications and variations which will be clear from the following description.

In the system shown in Figs. 5 and 6, I have also illustrated the form of protection against sudden reversal of power, which constitutes the subject-matter of the aforesaid Evans and Lewis application on a relaying system with directional indication storage. By this means, separate directional elements are provided, which are responsive only when there is a fault condition, with fault-current flowing from the line into the bus, and this response is utilized to provide a stored indication, which persists for two or four cycles after the reversal of fault-power, to ensure the maintenance of carrier-transmission for that short period of time, thus making the relaying system for the line 2 independent of a relay-circuit indication or condition in any other line.

Referring to either Fig. 5 or Fig. 6, I have provided a "ground-power-in" directional element 204, having no voltage-bias, and developing no torque except that which is due to the product of ground-current and residual voltage, multiplied by the sine of a suitable phase-angle plus the phase-ange between them. It has a restraining spring 205 which normally holds the movable element in position to close the back-contacts 206 and it has front-contacts 207 which are closed only when there is a ground-fault in such position that the fault-power flows into the line 2 from the bus 3.

I have also provided a "ground-power-out" directional element 208 which is similar to the element 204 except that the operating torque is produced when the fault-power is flowing out of the line instead of into the line. It has a restraining spring 209 which normally holds the movable element back against a back-stop 210, and it has front contacts 211 which are closed only when there is a ground-fault accompanied by ground power-flow from the line 2 to the bus 3. This directional element is associated with a "ground-out-timer" relay having an operating coil 212, a front- and back-contacts 213 and 214, and a light dashpot 215, or other suitable means for producing a slight hesitation of two or four cycles in the drop-out movement of the relay after it is deenergized.

I have also provided three individual single-phase "power-in" directional elements 216, 217 and 218, respectively, operative only when fault-power is flowing into the line in the delta-phases AB, BC and CA, respectively. These elements each have a restraining spring 219 and a voltage-restraint element 220 which is responsive to the line-voltage in the phase for which the directional element is designed to respond, the voltage for said restraint being obtained from a voltage-bus 221 which is illustrated as being energized by means of a step-down grounded-Y-connected potential-transformer 222, connected to the bus 3. If desired, as shown, the voltage-supply for the phase-directional elements may be obtained from an auxiliary voltage-bus 223 which is energized from a small motor-generator set 224 operating off of the main voltage-bus 221, in order to safeguard against the too sudden collapse of the reference voltage in the directional elements.

The "power-in" phase-directional elements 216, 217 and 218 are provided, respectively, with back- or break-contacts 225, 226 and 227, and front- or make-contacts 228, 229 and 230 respectively.

I also provide three separate "power-out" phase-directional elements 231, 232 and 233, which are similar to the "power-in" phase-directional elements 216, 217 and 218 except that they are connected so as to develop an operating torque only in the event of fault-power flowing out of the line 2 into the bus 3 in the particular delta-phase in which the directional element is connected. Each of these elements has a restraining spring 234, a voltage-restraint device 235, a back-stop 236, and a front contact member 237.

Each of the "power-out" phase-directional elements 231, 232 and 233 is associated with a separate "power-out" timer relay 238, 239 and 240 respectively, having front-contacts 241, 242 and 243, respectively, and back-contacts 244, 245 and 246, respectively. Each timer is associated with a dashpot 215 as already described for the "ground-out" timer relay 212.

The equipment shown in Fig. 5 also includes an instantaneous ground overcurrent relay $I_0$ having two make-contacts 247 and 248; three instantaneous delta-phase overcurrent relays $I_{AB}$, $I_{BC}$ and $I_{CA}$ each having two make-contacts 249—250, 251—252 and 253—254, respectively; an instantaneous residual voltage relay $V_0$ having a back- or break-contact 256; three instantaneous delta-phase voltage relays $V_{AB}$, $V_{BC}$ and $V_{CA}$, each having a make-contact, respectively numbered 257, 258 and 259; a delayed residual voltage relay $V'_0$ having a back-contact 260, and having a means for introducing a slight hesitation of a half-cycle or a cycle in its pick-up, said means being symbolized by a light dashpot 261, although in practice it will probably often consist merely of very springy contacts, so that the back-contacts are not broken until the relay has moved a considerable distance; and three delayed delta-phase voltage relays $V'_{AB}$, $V'_{BC}$ and $V'_{CA}$ each having a make-contact 262, 263 and 264, respectively, and each having a means for slightly delaying its drop-out so as to delay the breaking of its contact, as symbolized by the light dashpots 265.

The delta-phase currents for the various delta-phase relay devices are supplied by means of a set of auxiliary current-transformers 266.

The residual voltage for the various residual-voltage elements is provided by means of an auxiliary residual-voltage potential-transformer 267.

Other features of the system shown in Figs. 5 and 6 will be clear from the figures themselves and from the previous description and explanation of the system shown in Figs. 1 and 2, the same reference characters being utilized as far as applicable.

The operation will best be traced by reference to Fig. 6. It will be noted that the plate-current of the transmitter may be interrupted by any one of a number of different means. The back- or break-contacts 227, 226, 225 and 206 of the four different "power-in" directional relays are all connected in series, so that the opening of any one of them will interrupt the carrier-current transmission, but each one of these "power-in" contacts is shunted by a normally open- or make-contact 243, 242, 241, or 213, respectively, of its associated "power-out" timer, so that the plate-circuit cannot be opened for two or four cycles after a "power-out" fault-indication, while instantaneous opening of the transmitter plate-circuit is obtained if the "power-in" fault-indication comes during normal load conditions.

It will be noted that the directional elements utilized in the system shown in Figs. 5 and 6 will not respond to a fault-voltage indication in the absence of fault-current, so that the directional elements will not interrupt the transmitter plate-circuit under such a condition. However, connected in series with the back-contacts 227, 226, 225 and 206 of the "power-in" directional elements, are various means for interrupting the transmitter plate-circuit when there is a voltage-indication of a fault without a corresponding fault-current, but not when there is a corresponding fault-current.

As shown at the top of Fig. 6, the first means in this group comprises the back-contact 260 of the delayed residual-voltage relay f'₀, shunted by the front contact 248 of the instantaneous ground-current relay I₀. The time hesitation in the breaking of the voltage-responsive contact 260 is just long enough to give the current-responsive contact 248 time to close first, if it is going to close, before the voltage relay-contact 260 is broken.

Next come the make-contacts 262, 263 and 264 of the three delayed delta-voltage relays V'ₐʙ, V'ʙᴄ and V'ᴄₐ, individually shunted by their respective corresponding current-relay contacts 250, 252, and 254 of the instantaneous delta-phase current relays Iₐʙ, Iʙᴄ and Iᴄₐ, respectively. Normally all three of the voltage-relay contacts 262, 263 and 264 are closed. The delay introduced in the drop-out time of these voltage-relay contacts is just enough so that the current-relay contacts 250, 252 and 254 can first close if they are going to close, so that the transmitter plate-circuit will not be interrupted by the dropping-open of the voltage-relay contacts 262, 263 and 264, if at the same time there is a corresponding fault-current, but the transmitter-plate-circuit will be opened with the slight delay introduced by the dashpot 265 or equivalent means, in the event of a predetermined drop in any one of the delta-voltages AB, BC or CA in the absence of a predetermined value of the corresponding current in the same delta-phase.

It will be understood that the protective features just described, responding to residual voltage without ground-current, or responding to decreased delta-voltage without delta-current, are normally not operated at all, and do not affect the normal operation of the relaying system, coming into play only in those rare instances when there may not be an adequate source of current for supplying the bus at which the relaying system is located, in which case, there will be no material fault-current and it will be not only safe to remove the carrier-transmission in response to a voltage-indication of fault, that is, a predetermined rise in residual voltage or a predetermined fall in delta-voltage, but it will also be necessary to remove the carrier from this end of the line in order to permit instantaneous tripping at the other end, particularly for faults close to this end.

In case there should be no other line or apparatus connected to the bus 3, other than the line 2 being protected, it is safe to remove carrier instantly in response to a voltage-indication of fault, without any time-hesitation for interlocking with the corresponding current relays, and the drawings show means to this end, comprising the four instantaneous voltage-responsive indications of fault provided by the contacts 256, 257, 258 and 259 of the voltage relays V₀, Vₐʙ, Vʙᴄ and Vᴄₐ, said four contacts being in series with each other and shunted by auxiliary switches 270 on the circuit breakers 271 on all other lines connected to the bus 3 other than the circuit breaker 7 of the line 2 being protected, said auxiliary switches 270, if there are more than one of them, being all connected in parallel to each other and to the four voltage-relay contacts 256 to 259 which are in series with each other.

It may sometimes happen that the last source of any material size which is removed from connection with the bus 3 is disconnected at some other station other than the relaying station which is being protected. In such case, it will be necessary to rely upon the other equipment for protection, that is, the relays V'₀, V'ₐʙ, V'ʙᴄ and V'ᴄₐ. But where the disconnection of the bus 3 from all other sources is made at the relaying station itself, it is quite feasible, as shown, to introduce the protective feature just described, by the use of the auxiliary switches 270 on these other breakers.

If the protected line 2, itself, should be disconnected from its bus 3, it will, of course, never receive any fault-current from that bus, so that it is possible and desirable to automatically disconnect the carrier-current transmission, as is done, in the system shown in Figs. 5 and 6, by the auxiliary switch 272 of the circuit breaker 7 which normally connects the protected line 2 to the bus 3. When this circuit breaker is opened, its auxiliary switch 272 opens the plate-circuit of the transmitter and interrupts the transmission of carrier at that end of the line.

Reference to Fig. 6 will show that tripping is effected by an indication of fault-power flowing into the line, accompanied by fault-current of predetermined magnitude, and accompanied by a failure of carrier-reception, with a time-hesitation of two or three cycles introduced, for each type of fault, in case the "power-in" fault-indication occurs after a "power-out" fault-indication, but without any hesitation in case the "power-in" fault-indication occurs during normal operation when there has been no "power-out" fault-indication.

Fig. 6 shows four circuits for energizing the auxiliary fault-responsive positive bus FP in the case of four different types of fault. They are: a circuit from the positive bus through the make-contacts 207 of the "ground power-in" relay 204, the break-contacts 214 of the ground "out" timer 212, and the front-contact 247 of the ground overcurrent relay I₀, to the auxiliary fault-responsive positive bus FP: a second circuit from the positive bus through the make-contact 228 of the "power-in" directional element 216 in phase AB, the break-contact 244 of the corresponding power-out-responsive timer 238, and the make-contact 249 of the over-current relay Iₐʙ, to the auxiliary bus FP: and two other similar circuits for the BC and CA phases, as will be obvious.

It is not necessary to provide an interlock on the phase-directional elements 216, 217 and 218 to give preference to the ground-fault response in case there is a ground-current, because the voltage-restraint on these phase-directional elements is not wholly removed, as it is, in Figs. 1 and 2, by the current-responsive contacts 48 and 49 therein shown. In the system shown in Figs. 6 and 7, it is contemplated that the phase-directional elements will be so adjusted that they will not any of them respond at all, unless there is a fault in the actual phase in which it is connected. A single, line-to-ground fault, for example, would not cause a sufficient reduction in any delta-voltage, or a sufficient increase in any delta-phase current, to cause the actuation of any one of the six delta-connected directional elements responding respectively to "power-in" and "power-out" directions in the three delta-phases, respectively.

Reference to Fig. 6 will also show that the auxiliary relay X1 is energized whenever the FP bus is energized, and its make-contact 71 energizes the T1 timer, the auxiliary instantaneous element IT which is associated with the T1 timer in Fig. 1 being here omitted because the out-of-step protection is omitted in Figs. 5 and 6. The T1 timer is provided, as before, with a make-contact T1' which by-passes the contacts 14 and 76 of the receiver relay RR and the T3 timer, respectively, which in normal service complete the circuit from the FP bus to the trip coil 8. The T3 timer is energized as previously described in connection with Figs. 1 and 2, for providing the carrier-failure indication.

Figure 7:
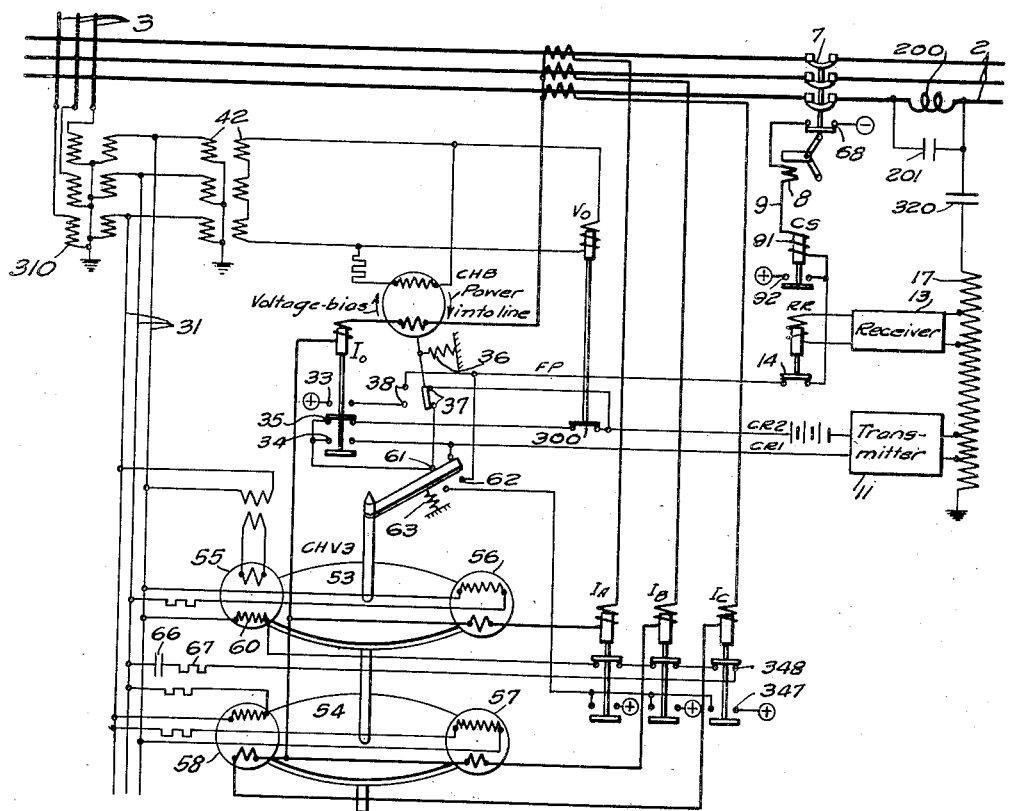
Figs. 7 and 8 are similar views showing a further modification.
Figure 8:
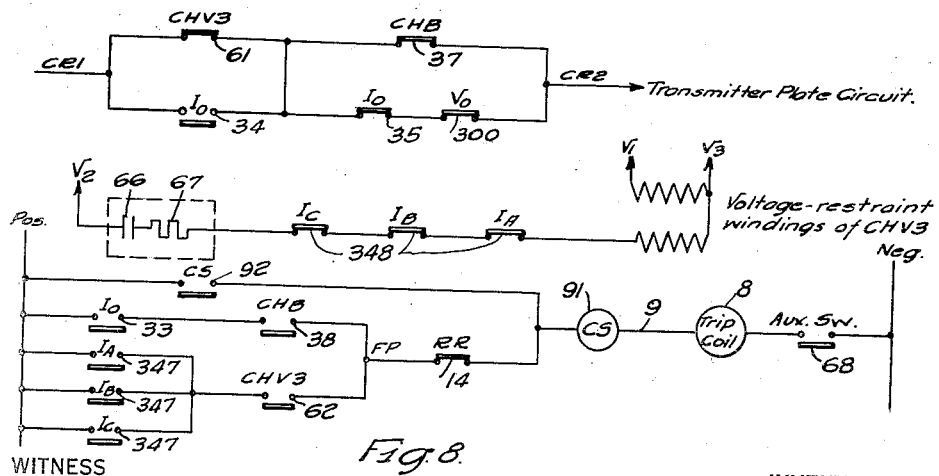

Another modification of my invention is shown in Figs. 7 and 8, designed to avoid certain difficulties in the design of the ground directional relay CHB described in connection with Figs. 1 and 2. Owing to the extreme sensitivity of this relay, it is sometimes hard to so adjust it that it will not respond to certain stray residual voltages that may occur on the transmission system or in the relay-voltage bus. In order to prevent this ground directional relay from removing carrier-current from its end of the protected line-section in response to very slight residual voltages which do not indicate the presence of a ground-fault, I may, as shown in Figs. 7 and 8, shunt CHB back-contact 37 with the back- or break-contact 309 of a residual-voltage relay Vo which does not respond to such low residual voltages and hence maintains the transmitter plate-circuit CR1—CR2 even though the CHB relay should open its back-contact in response to very small residual voltages.

The shunting circuit including the residual-voltage relay-contact 306 in Figs. 7 and 8 also includes a back-contact 35 which is provided on the ground-current relay Io, so that carrier current transmission is not maintained by the residual-voltage relay Vo if there is sufficient ground-current to develop a controlling ground-power directional torque in the ground directional relay CHB.

In the system shown in Figs. 7 and 8, if there is sufficient residual voltage to indicate a ground fault on the transmission system, without a corresponding ground current of fault-magnitude, the CHB relay and the Vo relay will both pick up and interrupt the carrier-transmission.

In Fig. 7, the relay-voltage bus 31 is represented as being excited by a potential transformer 310 connected to the bus 3. The carrier-frequency transformer 17 is illustrated as being coupled to the phase-conductor C of line 2 by a coupling capacitor 320. Instead of segregating the phase-to-phase faults into unbalanced faults and balanced faults, as was done in Fig. 1 in order to provide for out-of-step protection without interfering with any relay operations other than three-phase faults, I have indicated simply three line-current relays IA, IB, Ic, in Figs. 7 and 8, having front-contacts 347 which are connected in parallel between the positive bus and the CHV3 contact 62, and back-contacts 348 which are connected in series in the energizing circuit of the voltage coil 60 of the voltage-restraint wattmeter-element 55 of the CHV3 relay.

In other respects, the system shown in Figs. 7 and 8 may be similar to that shown in Figs. 1 and 2. Its operation will be sufficiently clear from what has already been said.

While I have shown my invention in three forms of embodiment thereof, it will be understood that various modifications and alterations may be resorted to, as will be more or less obvious to those skilled in the art, without departing from the general basic principles of my invention. I desire, therefore, that the appended claims shall be accorded the broadest interpretation consistent with their language and the prior art.

I claim as my invention:

1. Protective relaying equipment for effecting a control of line-sectionalizing circuit-interrupter means for a transmission line-section, comprising, at each end of the line-section being protected, relaying means including means for obtaining both a directional response to a fault-current power-flow into the protected line-section and also a response to a voltage-change which indicates the presence of a fault on the transmission-line under conditions when there is no corresponding current-flow of fault-magnitude, a communicating channel between the two ends of the line-section being protected, a transmitter means disposed at each end of the line-section for normally continuously transmitting a signalling current through said communicating channel to the other end of the line-section, transmitter-controlling means, responsive both to said directional response of the relaying means and the response to a voltage-indication of fault without corresponding fault-current, for causing said transmitter to cease transmitting effective signalling currents, a receiver disposed at each end of the line-section and associated with said communication channel, and receiver-means at each end, responsive to a failure of the receiver to receive a sufficient signalling current from the other end, and responsive also to the direction of power-current-flow into the receiver-end of the line-section being protected, for quickly energizing a control circuit for the circuit-interrupter means at that end.

2. Protective equipment for a line-section of a transmission-line, comprising line-sectionalizing circuit-interrupter means and relaying means therefor at each end of the line-section being protected, each of said relaying means phase-relay including means for securing a directional response to phase fault-current power-flow into the protected line-section and also a response to a voltage-change indicating the presence of a fault on the transmission-line without the accompaniment of a corresponding current-flow of fault-magnitude, means associated with said phase-relay means for preventing an effectual response to said phase-fault-indicative voltage-change, in response to the actual presence of a ground-fault on the transmission-line, each of said relaying means also including means for providing an indication of the actual presence of a fault on the transmission-line, means for providing an intelligence-communicating channel between the two ends of the protected line-section, auxiliary means associated with said intelligence-communicating channel for selectively cooperating with the aforesaid responses of said relaying means at the two ends of the protected line-section so as to provide a trip-circuit indication, and trip-circuit means, at each end, for quickly actuating the circuit-interrupter means at its end of the protected line-section, said trip-circuit means being responsive to said trip-circuit indication and being also responsive to an indication of the actual presence of a fault.

3. Protective equipment for a line-section of a polyphase transmission-line, comprising line-sectionalizing circuit-interrupter means and relaying means therefor at each end of the line-section being protected, each of said relaying means including a ground-directional relay having back-contacts and a movable element associated therewith, yieldable means for biasing the movable element toward the back-contacts, means for producing a power-direction-responsive torque tending to open the back-contacts in response to ground-current-flow into the protected line-section, and means responsive to ground-voltage alone, in the absence of ground-current, for developing a torque tending to open the back-contacts, each of said relaying means further including a ground-fault-indicating relay responsive to the actual presence of a ground-fault on the transmission-line, in combination with transmitter means at each end of the line-section being protected for normally transmitting a signalling current, receiver means at each end of the line-section for receiving the signalling current transmitted from the other end, trip-circuit means, at each end of the protected line-section, responsive to a cessation of sufficient signalling current in the receiver means, and responsive also to a response of the ground-directional relay, and further responsive to the ground-fault-indicating relay, for quickly establishing a trip circuit for actuating the circuit interrupter means at that end of the protected line-section, and means quickly operative in response to an opening of the back-contacts of the ground-directional relay for causing an interruption in the transmission of a sufficient signalling current by the transmitter means at that end of the protected line-section.

4. Protective means for a line-section of a polyphase transmission-line, comprising a ground-directional relay having back-contacts and a movable element associated therewith, yieldable means for biasing the movable element toward the back-contacts, means for producing a power-direction-responsive torque tending to open the back-contacts in response to ground-current flow into the protected line-section, and means responsive to ground-voltage alone, in the absence of ground-current, for developing a torque tending to open the back-contacts.

5. Protective equipment for a line-section of a transmission-line, comprising line-sectionalizing circuit-interrupter means and relaying means therefor at each end of the line-section being protected, each of said relaying means including a phase-directional element having back-contacts and a movable member associated therewith, yieldable biasing means tending to move said movable element so as to open said back-contacts, means for developing a voltage-restraint torque responsive to phase-to-phase line-voltages of the transmission-line, said voltage-restraint torque being in such direction as to tend to hold the movable element against the back-contacts, and means for developing a phase-to-phase power-directional torque which tends to open the back-contacts in response to phase-to-phase fault-current-flow into the protected line-section, each of said relaying means further including phase-to-phase fault-responsive means responsive to the actual presence of a phase-to-phase fault on the transmission-line, in combination with transmitter means at each end of the line-section being protected for normally transmitting a signalling current, receiver means at each end of the line-section for receiving the signalling current transmitted from the other end, trip-circuit means, at each end of the protected line-section, responsive to a cessation of sufficient signalling current in the receiver means, and responsive also to a response of the phase-directional element, and further responsive to the phase-to-phase fault-responsive means, for quickly establishing a trip-circuit for actuating the circuit-interrupter means at that end of the protected line-section, and means quickly operative in response to an opening of the back-contacts of the phase-directional element for causing an interruption in the transmission of a sufficient signalling current by the transmitter means at that end of the protected line-section.

6. Protective means for a line-section of a transmission-line, comprising a phase-directional relay element having back-contacts and a movable member associated therewith, yieldable biasing means tending to move said movable element so as to open said back-contacts, means for developing a voltage-restraint torque responsive to phase-to-phase line-voltages of the transmission line, said voltage-restraint torque being in such direction as to tend to hold the movable element against the back-contacts, and means for developing a phase-to-phase power-directional torque which tends to open the back-contacts in response to phase-to-phase current-flow into the protected line-section.

7. Protective equipment for a line-section of a three-phase transmission-line, comprising line-sectionalizing circuit-interrupter means and relaying means therefor at each end of the line-section being protected, each of said relaying means including a phase-directional relay element having back-contacts and a movable member associated therewith, yieldable biasing means tending to move said movable element so as to open said back-contacts, means for developing a voltage-restraint torque responsive to the area of the delta-voltage triangle of the transmission-line voltages, said voltage-restraint torque being in such direction as to tend to hold the movable element against the back-contacts, and three separate phase-to-phase power-directional torque-producing means responsive to the direction of power-flow in the three respective delta-phases of the protected line-section for developing torques in such direction as to tend to open the back-contacts in response to delta-phase fault-current-flow into the protected line-section, each of said relaying means further including phase-to-phase fault-responsive means responsive to the presence of a phase-to-phase fault on the transmission-line, in combination with transmitter means at each end of the line-section being protected for normally transmitting a signalling current, receiver means at each end of the line-section for receiving the signalling current transmitted from the other end, trip-circuit means, at each end of the protected line-section, responsive to a cessation of sufficient signalling current in the receiver means, and responsive also to a response of the phase-directional element, and further responsive to the phase-tophase fault-responsive means for quickly establishing a trip circuit for actuating the circuit-interrupter means at that end of the protected line-section, and means quickly operative in response to an opening of the back-contacts of the phase-directional relay for causing an interruption in the transmission of a sufficient signalling current by the transmitter-means at that end of the protected line-section.

8. Protective means for a line-section of a three-phase transmission line, comprising a phase-directional element having back-contacts and a movable member associated therewith, yieldable biasing means tending to move said movable element so as to open said back-contacts, means for developing a voltage-restraint torque responsive to the area of the delta-voltage triangle of the transmission-line voltages, said voltage-restraint torque being in such direction as to tend to hold the movable element against the back-contacts, and three separate phase-to-phase power-directional torque-producing means responsive to the direction of power-flow in the three respective delta-phases of the protected line-section for developing torques in such direction as to tend to open the back-contacts in response to delta-phase fault-current-flow into the protected line-section.

9. Protective equipment for a line-section of a polyphase synchronous transmission-line subject to both ground faults and phase-to-phase faults, comprising line-sectionalizing circuit-interrupter means and relaying means therefor at each end of the line-section being protected, each of said relaying means including a quick-acting phase directionally responsive relaying means responsive to phase-to-phase faults, a quick-acting ground directionally responsive relaying means responsive to ground faults, residual-voltage means for giving a voltage indication of fault, comprising a sluggishly acting residual-voltage relay with back-contacts which open slowly when the relay is energized, phase-to-phase voltage means for giving a voltage-indication of fault, comprising sluggishly acting phase-to-phase voltage relay-means having front-contacts which open slowly when the relay-means is insufficiently energized after having been energized, and a plurality of different fault-indicating quick-acting relaying means for responding to the presence of different types of faults somewhere on the transmission-line, a communicating-channel between the two ends of the protected line-section, transmitter means at each end of the protected line-section for normally transmitting a signal current through said communicating-channel, receiver means at each end of the protected line-section for receiving the signalling current transmitted from the other end, trip-circuit means quickly operative at each end of the protected line-section for actuating its associated line-sectionalizing means, said trip-circuit means being responsive to a cessation of a sufficient received current in said receiver means, and being further responsive to either a joint internal-fault indication of said phase directionally responsive relaying means and an indication of a corresponding fault-indicating relaying means, or a joint internal-fault indication of said ground directionally responsive relaying means and an indication of a corresponding fault-indicating relaying means, transmitter-controlling means at each end of the protected line-section for causing a quick cessation of the transmission of a sufficient signalling current by said transmitter in response to either an internal-fault indication of either one of said directionally responsive relaying means at that end, or in response to either of said voltage-indications of fault, and means responsive to the several fault-indicating relaying means for locking out the corresponding voltage-indications of fault so as to prevent the cessation of the transmitted signalling current in response to the voltage-indications of fault if there is a simultaneous indication of a corresponding fault somewhere on the transmission line.

10. Protective relaying equipment for effecting a control of line-sectionalizing circuit-interrupter means for a transmission line-section, comprising, at each end of the line-section being protected, relaying means including means for obtaining both a directional response to a fault-current power-flow into the protected line-section and also a response to a voltage-change which indicates the presence of a fault on the transmission-line under conditions when there is no corresponding current-flow of fault-magnitude, said relaying means also including fault-indicating means for securing an indication of the actual presence of a fault on the transmission-line, a communicating-channel between the two ends of the line-section being protected, a transmitter means disposed at each end of the line-section for normally continuously transmitting a signalling current through said communicating channel to the other end of the line-section, transmitter-controlling means, responsive both to said directional response of the relaying means and the response to the voltage-indication of fault without corresponding fault-current, for causing said transmitter to cease transmitting effective signalling current, receiver means at each end of the line-section for receiving the signalling current transmitted from its own end as well as the other end, and trip-circuit means at each end of the protected line-section for quickly energizing a control-circuit for the circuit-interrupter means, said trip-circuit means being responsive to a failure of the receiver to receive a sufficient signalling current, and being responsive also to an indication of the actual presence of a fault on the transmission-line.

11. Protective equipment for a line-section of a polyphase synchronous transmission-line subject to both ground faults and phase-to-phase faults, comprising line-sectionalizing circuit-interrupter means and relaying means therefor at each end of the line-section being protected, each of said relaying means including a quick-acting phase directionally responsive relaying means responsive to phase-to-phase faults, a quick-acting ground directionally responsive relaying means responsive to ground faults, residual-voltage means for giving a voltage-indication of fault, comprising a sluggishly acting residual-voltage relay with back-contacts which open slowly when the relay is energized, phase-to-phase voltage means for giving a voltage-indication of fault, comprising sluggishly acting phase-to-phase voltage-relay means having front-contacts which open slowly when the relay-means is insufficiently energized after having been energized, and a plurality of different fault-indicating quick-acting relaying means for responding to the presence of different types of fault somewhere on the transmission-line, a communicating-channel between the two ends of the protected line-section, transmitter means at each end of the protected line-section for normally transmitting a signal current through said communicating-channel, receiver means at each end of the protected line-section for receiving the signalling current transmitted from its own end as well as the other end, trip-circuit means quickly operative at each end of the protected line-section for actuating its associated line-sectionalizing means, said trip-circuit means being responsive to a cessation of a sufficient received current in said receiver means, and being further responsive to a response of a fault-indicating relaying means at that end of the protected line-section, and transmitter-controlling means at each end of the protected line-section for causing a quick cessation of the transmission of a sufficient signalling current by said transmitter in response to either an internal-fault indication of either one of said directionally responsive relaying means at that end, or in response to either of said voltage-indications of fault, and means responsive to the several fault-indicating relaying means for locking out the corresponding voltage-indications of fault so as to prevent the cessation of the transmitted signalling current in response to the voltage-indications of fault if there is a simultaneous indication of a corresponding fault somewhere on the transmission-line.

12. Protective equipment for a line-section of a polyphase transmission-line, comprising line-sectionalizing circuit-interrupter means and relaying means therefor at each end of the line-section being protected, each of said relaying means including a ground-directional relay having a yieldable restraining biasing means, means for producing a power-direction-responsive torque in the actuating direction in response to ground-current-flow into the protected line-section, and means responsive to ground-voltage alone, in the absence of ground-current, for developing a torque in the actuating direction, each of said relaying means further including a ground-fault-indicating relay responsive to the actual presence of a ground-fault on the transmission-line, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the ground-directional relay, and to an actuation of the ground-fault-indicating relay, for quickly establishing a trip circuit for actuating the circuit-interrupter means at that end of the protected line-section, and means quickly operative in response to an actuation of the ground-directional relay for causing an interruption in the transmission of a sufficient signalling current by the transmitter means at that end of the protected line-section.

13. Protective equipment for a line-section of a polyphase transmission-line, comprising a ground-directional relay having a yieldable restraining biasing means, means for producing a power-direction-responsive torque in the actuating direction in response to ground-current-flow into the protected line-section, and means responsive to ground-voltage alone, in the absence of ground-current, for developing a torque in the actuating direction.

14. Protective equipment for a line-section of a transmission-line, comprising line-sectionalizing circuit-interrupter means and relaying means therefor at each end of the line-section being protected, each of said relaying means including a phase-directional relay element having a yieldable actuating biasing means tending to actuate the relay, means for developing a voltage-restraint torque responsive to phase-to-phase line-voltages of the transmission-line, tending to restrain the actuation of the relay, and means for developing a phase-to-phase power-directional torque which tends to actuate the relay in response to phase-to-phase fault-current-flow into the protected line-section, each of said relaying means further including phase-to-phase fault-responsive means responsive to the actual presence of a phase-to-phase fault on the transmission-line, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the phase-directional element, and to an actuation of the phase-to-phase fault-responsive means, for quickly establishing a trip-circuit for actuating the circuit-interrupter means at that end of the protected line-section, and means quickly operative in response to an actuation of the phase-directional element for causing an interruption in the transmission of a sufficient signalling current by the transmitter means at that end of the protected line-section.

15. Protective equipment for a line-section of a transmission-line, comprising a phase-directional relay element having a yieldable actuating biasing means tending to actuate the relay, means for developing a voltage-restraint torque responsive to phase-to-phase line-voltages of the transmission-line tending to restrain the actuation of the relay, and means for developing a phase-to-phase power-directional torque which tends to actuate the relay in response to phase-to-phase fault-current-flow into the protected line-section, in combination with means associated with said phase-directional element for preventing an effectual response to said yieldable biasing means under reduced voltage-restraint conditions, in response to the actual presence of a ground-fault on the transmission-line.

16. Protective equipment for a line-section of a three-phase transmission-line, comprising line-sectionalizing circuit-interrupter means and relaying means therefor at each end of the line-section being protected, each of said relaying means including a phase-directional relay element having a yieldable actuating biasing means tending to actuate the relay, means for developing a voltage-restraint torque responsive to the area of the delta-voltage triangle of the transmission-line voltages tending to restrain the actuation of the relay, and three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, each of said relaying means further including phase-to-phase fault-responsive means responsive to the presence of a phase-to-phase fault on the transmission-line, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the phase-directional element, and to an actuation of the phase-to-phase fault-responsive means for quickly establishing a trip circuit for actuating the circuit-interrupter means at that end of the protected line-section, and means quickly operative in response to an actuation of the phase-directional relay for causing an interruption in the transmission of a sufficient signalling current by the transmitter-means at that end of the protected line-section.

17. Protective equipment for a line-section of a three-phase transmission-line, comprising a phase-directional relay element having a yieldable actuating biasing means tending to actuate the relay, means for developing a voltage-restraint torque responsive to the area of the delta-voltage triangle of the transmission-line voltages tending to restrain the actuation of the relay, and three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, in combination with means associated with said phase-directional element for preventing an effectual response to said yieldable biasing means under reduced voltage-restraint conditions, in response to the actual presence of a ground-fault on the transmission-line.

18. Protective equipment for a line-section of a transmission-line, comprising line-sectionalizing circuit-interrupter means and relaying means therefor at each end of the line-section being protected, each of said relaying means including a phase-directional relay element having a yieldable actuating biasing means tending to actuate the relay, electromagnetic restraint-means for developing a restraining torque tending to restrain the actuation of the relay, and means for developing a phase-to-phase power-directional torque which tends to actuate the relay in response to phase-to-phase fault-current-flow into the protected line-section, each of said relaying means further including phase-to-phase fault-responsive means responsive to the actual presence of a phase-to-phase fault on the transmission line, means responsive to said phase-to-phase fault-responsive means for quickly reducing the torque exerted by said electromagnetic restraint-means, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the phase-directional element, and to an actuation of the phase-to-phase fault-responsive means, for quickly establishing a trip-circuit for actuating the circuit-interrupter means at that end of the protected line-section, and means quickly operative in response to an actuation of the phase-directional element for causing an interruption in the transmission of a sufficient signalling current by the transmitter means at that end of the protected line-section.

19. Protective equipment for a line-section of a transmission-line, comprising a phase-directional relay element having a yieldable actuating biasing means tending to actuate the relay, electromagnetic restraint-means for developing a restraining torque, tending to restrain the actuation of the relay, means for developing a phase-to-phase power-directional torque which tends to actuate the relay in response to phase-to-phase fault-current-flow into the protected line-section, and transmission-line-current-responsive means for quickly reducing the torque exerted by said electromagnetic restraint-means.

20. Protective equipment for a line-section of a transmission-line, comprising line-sectionalizing circuit-interrupter means and relaying means therefor at each end of the line-section being protected, each of said relaying means including a phase-directional relay element having electromagnetic restraint-means for developing a restraining torque tending to restrain the actuation of the relay, and means for developing a phase-to-phase power-directional torque which tends to actuate the relay in response to phase-to-phase fault-current-flow into the protected line-section, each of said relaying means further including phase-to-phase fault-responsive means responsive to the actual presence of a phase-to-phase fault on the transmission-line, means responsive to said phase-to-phase fault-responsive means for quickly reducing the torque exerted by said electromagnetic restraint-means, in combination with transmitter-means at each end of the line-section being protected for transmitting signals to the other end in accordance with conditions indicated by said relaying means, receiver means at each end of the line-section for responding to the signals transmitted from the other end, trip-circuit means, at each end, responsive to said received signals in said receiver means, and further responsive to an actuation of the phase-directional element, and to the actual presence of a phase-to-phase fault, for quickly establishing a trip-circuit for actuating the circuit-interrupter means at that end of the protected line-section, and means quickly operative in response to an actuation of the phase-directional element for causing the transmission of a predetermined signal by the transmitter means at that end of the protected line-section.

21. Protective equipment for a line-section of a transmission-line, comprising a phase-directional relay element having electromagnetic restraint-means for developing a restraining torque, tending to restrain the actuation of the relay, means for developing a phase-to-phase power-directional torque which tends to actuate the relay in response to phase-to-phase fault-current-flow into the protected line-section, and transmission-line-current-responsive means for quickly reducing the torque exerted by said electromagnetic restraint-means.

22. Protective equipment for a line-section of a three-phase transmission-line, comprising line-sectionalizing circuit-interrupter means and relaying means therefor at each end of the line-section being protected, each of said relaying means including a phase-directional relay element having a yieldable actuating biasing means tending to actuate the relay, electromagnetic restraint-means for developing a restraining torque tending to restrain the actuation of the relay, and three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, each of said relaying means further including phase-to-phase fault-responsive means responsive to the presence of a phase-to-phase fault on the transmission-line, means responsive to said phase-to-phase fault-responsive means for quickly reducing the torque exerted by said electromagnetic restraint-means, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the phase-directional element, and to an actuation of the phase-to-phase fault-responsive means, for quickly establishing a trip circuit for actuating the circuit-interrupter means at that end of the protected line-section, and means quickly operative in response to an actuation of the phase-directional relay for causing an interruption in the transmission of a sufficient signalling current by the transmitter-means at that end of the protected line-section.

23. Protective equipment for a line-section of a three-phase transmission-line, comprising a phase-directional relay element having a yieldable actuating biasing means tending to actuate the relay, electromagnetic restraint-means for developing a restraining torque tending to restrain the actuation of the relay, three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, and transmission-line-current responsive means for quickly reducing the torque exerted by said electromagnetic restraint-means.

24. Protective equipment for a line-section of a three-phase transmission-line, comprising line-sectionalizing circuit-interrupter means and relaying means therefor at each end of the line-section being protected, each of said relaying means including a phase-directional relay element having electromagnetic restraint-means for developing a restraining torque tending to restrain the actuation of the relay, and three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, each of said relaying means further including phase-to-phase fault-responsive means responsive to the presence of a phase-to-phase fault on the transmission line, for quickly reducing the torque exerted by said electromagnetic restraint-means, in combination with transmitter-means at each end of the line-section being protected for transmitting signals to the other end in accordance with line-frequency conditions, receiver means at each end of the line-section for responding to the signals transmitted from the other end, trip-circuit means, at each end, responsive to said received signals in said receiver means, and further responsive to an actuation of the phase-directional element, and to the actual presence of a phase-to-phase fault, for quickly establishing a trip circuit for actuating the circuit-interrupter means at that end of the protected line-section, and means quickly operative in response to an actuation of the phase-directional relay for causing the transmission of a predetermined signal by the transmitter-means at that end of the protected line-section.

25. Protective equipment for a line-section of a three-phase transmission-line, comprising a phase-directional relay element having electromagnetic restraint-means for developing a restraining torque tending to restrain the actuation of the relay, three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, and transmission-line-current-responsive means for quickly reducing the torque exerted by said electromagnetic restraint-means.

26. Protective equipment for a line-section of a transmission-line, comprising line-sectionalizing circuit-interrupter means and relaying means therefor at each end of the line-section being protected, each of said relaying means including a phase-directional relay element having a yieldable actuating biasing means tending to actuate the relay, electromagnetic restraint-means for developing a restraining torque tending to restrain the actuation of the relay, and means for developing a phase-to-phase power-directional torque which tends to actuate the relay in response to phase-to-phase fault-current-flow into the protected line-section, each of said relaying means further including phase-to-phase fault-responsive means responsive to the actual presence of a phase-to-phase fault on the transmission line, means responsive to said phase-to-phase fault-responsive means for quickly reducing the torque exerted by said electromagnetic restraint-means, in combination with transmitter-means at each end of the line-section being protected for normally transmitting a signalling current, receiver means at each end of the line-section for receiving the signalling current transmitted from its own end as well as the other end, trip-circuit means, at each end of the protected line-section, responsive to a cessation of a sufficient signalling current in the receiver means, and responsive also to a response of the phase-to-phase fault-responsive means, for quickly establishing a trip-circuit for actuating the circuit-interrupter means at that end of the protected line-section, and means quickly operative in response to an actuation of the phase-directional element for causing an interruption in the transmission of a sufficient signalling current by the transmitter means at that end of the protected line-section.

27. Protective equipment for a line-section of a transmission-line, comprising line-sectionalizing circuit-interrupter means and relaying means therefor at each end of the line-section being protected, each of said relaying means including a phase-directional relay element having electromagnetic restraint-means for developing a restraining torque tending to restrain the actuation of the relay, and means for developing a phase-to-phase power-directional torque which tends to actuate the relay in response to phase-to-phase fault-current-flow into the protected line-section, each of said relaying means further including phase-to-phase fault-responsive means responsive to the actual presence of a phase-to-phase fault on the transmission line, means responsive to said phase-to-phase fault-responsive means for quickly reducing the torque exerted by said electromagnetic restraint-means, in combination with transmitter means at each end of the line-section being protected for normally transmitting a signalling current, receiver means at each end of the line-section for receiving the signalling current transmitted from its own end as well as the other end, trip-circuit means, at each end of the protected line-section, responsive to a cessation of a sufficient signalling current in the receiver means, and responsive also to a response of the phase-to-phase fault-responsive means, for quickly establishing a trip-circuit for actuating the circuit-interrupter means at that end of the protected line-section, and means quickly operative in response to an actuation of the phase-directional element for causing an interruption in the transmission of a sufficient signalling current by the transmitter means at that end of the protected line-section.

28. Protective equipment for a line-section of a three-phase transmission-line, comprising line-sectionalizing circuit-interrupter means and relaying means therefor at each end of the line-section being protected, each of said relaying means including a phase-directional relay element having a yieldable actuating biasing means tending to actuate the relay, electromagnetic restraint-means for developing a restraining torque tending to restrain the actuation of the relay, and three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, each of said relaying means further including phase-to-phase fault-responsive means responsive to the presence of a phase-to-phase fault on the transmission-line, means responsive to said phase-to-phase fault-responsive means for quickly reducing the torque exerted by said electromagnetic restraint-means, in combination with transmitter means at each end of the line-section being protected for normally transmitting a signalling current, receiver means at each end of the line-section for receiving the signalling current transmitted from its own end as well as the other end, trip-circuit means, at each end of the protected line-section, responsive to a cessation of a sufficient signalling current in the receiver means, and responsive also to a response of the phase-to-phase fault-responsive means, for quickly establishing a trip circuit for actuating the circuit-interrupter means at that end of the protected line-section, and means quickly operative in response to an actuation of the phase-directional relay for causing an interruption in the transmission of a sufficient signalling current by the transmitter-means at that end of the protected line-section.

29. Protective equipment for a line-section of a three-phase transmission-line, comprising line-sectionalizing circuit-interrupter means and relaying means therefor at each end of the line-section being protected, each of said relaying means including a phase-directional relay element having electromagnetic restraint-means for developing a restraining torque tending to restrain the actuation of the relay, and three separate phase-to-phase power-directional torque-producing means responsive to the direction of power-flow in the three respective delta-phases of the protected line-section for developing torques in such direction as to tend to actuate the relay in response to delta-phase fault-current-flow into the protected line-section, each of said relaying means further including phase-to-phase fault responsive means responsive to the presence of a phase-to-phase fault on the transmission line, means responsive to said phase-to-phase fault-responsive means for quickly reducing the torque exerted by said electromagnetic restraint-means, in combination with transmitter means at each end of the line-section being protected for normally transmitting a signalling current, receiver means at each end of the line-section for receiving the signalling current transmitted from its own end as well as the other end, trip-circuit means, at each end of the protected line-section, responsive to a cessation of a sufficient signalling current in the receiver means, and responsive also to a response of the phase-to-phase fault-responsive means, for quickly establishing a trip circuit for actuating the circuit-interrupter means at that end of the protected line-section, and means quickly operative in response to an actuation of the phase-directional relay for causing an interruption in the transmission of a sufficient signalling current by the transmitter-means at that end of the protected line-section.

30. Protective equipment for a line-section of a polyphase transmission-line, comprising line-sectionalizing means and relaying means therefor at each end of the line-section being protected, each of said relaying means including a ground-directional relay having back-contacts and a movable element associated therewith, means for producing a power-direction-responsive torque tending to open the back-contacts in response to ground-current-flow into the protected line-section, and means responsive to ground-voltage alone, in the absence of ground-current, for developing a torque tending to open the back-contacts, each of said relaying means further including an element responsive to the actual presence of a ground-fault on the transmission-line, in combination with transmitter means at each end of the line-section being protected for normally transmitting a signalling current, receiver means at each end of the line-section for receiving the signalling current transmitted from the other end, trip-circuit means, at each end of the protected line-section, responsive to a cessation of sufficient signalling current in the receiver means, and responsive also to a response of the ground-directional relay and further responsive to the ground-fault-indicating relay, for quickly establishing a trip circuit for actuating the circuit-interrupter means at that end of the protected line-section, and means quickly operative in response to an opening of the back-contacts of the ground-directional relay for causing an interruption in the transmission of a sufficient signalling current by the transmitter means at that end of the protected line-section.

31. Protective means for a line-section of a polyphase transmisison-line, comprising a ground-directional relay having back-contacts and a movable element associated therewith, means for producing a power-direction-responsive torque tending to open the back-contacts in response to ground-current flow into the protected line-section, and means responsive to ground-voltage alone, in the absence of ground-current, for developing a torque tending to open the back-contacts.

32. Protective equipment for a line-section of a polyphase transmission-line, comprising line-sectionalizing circuit-interrupter means and relaying means therefor at each end of the line-section being protected, each of said relaying means including a ground-directional relay having means for producing a power-direction-responsive torque in the actuating direction in response to ground-current-flow into the protected line-section, and means responsive to ground-voltage alone, in the absence of ground-current, for developing a torque in the actuating direction, each of said relaying means further including an element responsive to the actual presence of a ground-fault on the transmission-line, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the ground-directional relay, and to an actuation of the ground fault-indicating relay, for quickly establishing a trip circuit for actuating the circuit-interrupter means at that end of the protected line-section, and means quickly operative in response to an actuation of the ground-directional relay for causing an interruption in the transmission of a sufficient signalling current by the transmitter means at that end of the protected line-section.

33. Protective equipment for a line-section of a polyphase transmission-line, comprising a ground-directional relay having means for producing a power-direction-responsive torque in the actuating direction in response to ground-current-flow into the protected line-section, and means responsive to ground-voltage alone, in the absence of ground-current, for developing a torque in the actuating direction.

34. In a transmission system, protective relaying equipment for effecting a control of line-sectionalizing circuit-interrupter means for a transmission line-section, comprising, at each end of the line-section being protected, actuating means for each of said circuit-interrupter means, inhibiting means operative on the actuating means at both ends of the protected line-section for preventing actuation of said circuit-interrupter means, and relaying means including directional means for obtaining an indication of fault in the direction toward the protected line-section, and voltage-responsive means responsive to a component of voltage not present under normal conditions, in the absence of positive directional indication from said directional means, said directional means and voltage-responsive means operating to render said inhibiting means ineffective.

35. In a transmission system, protective relaying equipment for effecting a control of line-sectionalizing circuit-interrupter means for a transmission line-section, comprising, at each end of the line-section being protected, actuating means for each of said circuit-interrupter means, inhibiting means operative on the actuating means at both ends of the protected line-section for preventing actuation of said circuit-interrupter means, and relaying means including directional means for obtaining an indication of fault in the direction toward the protected line-section, and voltage-responsive means responsive to a voltage-condition not present under normal conditions, in the absence of positive directional indication from said directional means, said directional means and voltage-responsive means operating to render said inhibiting means ineffective.

36. In a transmission system, protective relaying equipment for effecting a control of line-sectionalizing circuit-interrupter means for a transmission line-section, comprising, at each end of the line-section being protected, actuating means for each of said circuit-interrupter means, inhibiting means operative on the actuating means at both ends of the protected line-section for preventing actuation of said circuit-interrupter means, and relaying means including directional means for producing a force in the one direction or the other dependent upon the existence of a transmission-system fault on the one side or the other of the directional means in question, and voltage-responsive means responsive to a component of voltage not present under normal conditions, in the absence of an effective directional force in said directional means, said directional means and voltage-responsive means operating to render said inhibiting means ineffective.

37. In a transmission system, protective relaying equipment for effecting a control of line-sectionalizing circuit-interrupter means for a transmission line-section, comprising, at each end of the line-section being protected, actuating means for each of said circuit-interrupter means, inhibiting means operative on the actuating means at both ends of the protected line-section for preventing actuation of said circuit-interrupter means, and relaying means including directional means for producing a force in the one direction or the other dependent upon the existence of a transmission-system fault on the one side or the other of the directional means in question, and voltage-responsive means responsive to a voltage-condition not present under normal conditions, in the absence of an effective directional force in said directional means, said directional means and voltage-responsive means operating to render said inhibiting means ineffective.

38. Protective equipment for a line-section of a polyphase transmission-line, comprising line-sectionalizing circuit-interrupter means and relaying means therefor at each end of the line-section being protected, each of said relaying means including a ground-directional relay having means for producing a power-direction-responsive torque in the actuating direction in response to ground-current-flow into the protected line-section, and means responsive to ground-voltage alone, in the absence of ground-current, for developing a torque in the actuating direction, each of said relaying means further including a ground-current-responsive element responsive to the actual presence of a ground-fault on the transmission-line, and a residual-voltage element, in combination with transmitter means at each end of the line-section being protected for normally transmitting a signalling current, receiver means at each end of the line-section for receiving the signalling current transmitted from the other end, trip-circuit means, at each end, responsive to a cessation of a sufficient received current in said receiver means, and further responsive to an actuation of the ground-directional relay, and to an actuation of the ground fault-indicating relay, for quickly establishing a trip circuit for actuating the circuit-interrupter means at the end of the protected line-section, means quickly operative in response to an actuation of the ground-directional relay for causing an interruption in the transmission of a sufficient signalling current by the transmitter means at that end of the protected line-section, and means responsive jointly to the non-actuation of both said ground-current-responsive element and said residual-voltage relay for rendering the ground-directional relay unable to cause an interruption of said sufficient signalling current.

39. In a transmission system, protective equipment for a line-section of a polyphase synchronous transmission-line subject to both ground faults and phase-to-phase faults, comprising line-sectionalizing circuit-interrupter means and relaying means therefor at each end of the line-section being protected, each of said relaying means including a quick-acting phase directionally responsive relaying means responsive to phase-to-phase faults, a quick-acting ground directionally responsive relaying means responsive to ground faults, and fault-indicating means for responding when there is a fault on the transmission system, a communicating-channel between the two ends of the protected line-section, transmitter means at each end of the protected line-section for transmitting a signal by means of said communicating-channel, receiver-means at each end of the protected line-section for responding to the transmitted signal, trip-circuit means operatively associated with the receiver means and the relaying means at each end of the protected line-section for actuating its associated line-sectionalizing means, means responsive to a predetermined directional indication of either said phase directionally responsive relaying means or said ground directionally responsive relaying means for controlling the transmission of said signal, and fault-responsive means responsive to a predetermined kind of fault for rendering one of said directionally responsive relaying means unable to control the transmission of said signal.

40. Protective relaying equipment for effecting a control of line-sectionalizing circuit-interrupter means for a transmission line-section, comprising, at each end of the line-section being protected, relaying means including means for obtaining both a directional response to a fault-current power-flow in a predetermined direction in the protected line-section and also a response to a voltage-change which indicates the presence of a fault on the transmission-line under conditions when there is no corresponding current-flow of fault-magnitude, a communicating channel between the two ends of the line-section being protected, a transmitter means capable of transmitting an effective signal to said communicating channel, a receiver relay capable of receiving and responding to said signal, transmitter-controlling means, responsive both to said directional response of the relaying means and the response to a voltage-indication of fault without corresponding fault-current, for controlling said signal-transmitting means, and circuit-interrupter-controlling means at each end, responsive both to said receiver means and to an indication of a transmission-line fault, for energizing a control-circuit for the circuit-interrupter at that end.

41. Protective equipment for a line-section of a transmission-line, comprising line-sectionalizing circuit-interrupter means and relaying means therefor at each end of the line-section being protected, each of said relaying means including phase-relay means for securing a directional response to fault-current power-flow in a predetermined direction in the protected line-section and also a response to a voltage-change indicating the presence of a phase fault on the transmission-line without the accompaniment of corresponding current-flow of fault-magnitude, means associated with said phase-relay means for preventing an effectual response to said phase-fault-indicative voltage-change, in response to the actual presence of a ground-fault on the transmission-line, each of said relaying means also including means for providing an indication of the actual presence of a fault on the transmission-line, means for providing an intelligence-communicating channel between the two ends of the protected line-section, auxiliary means associated with said intelligence-communicating channel for selectively cooperating with the aforesaid responses of said relaying means at the two ends of the protected line-section so as to provide a trip-circuit indication, and trip-circuit means, at each end, for actuating the circuit-interrupter means at its end of the protected line-section, said trip-circuit means being responsive to said trip-circuit indication and being also responsive to an indication of the actual presence of a fault.

42. Protective equipment for a line-section of a transmission-line, comprising line-sectionalizing circuit-interrupter means and relaying means therefor at each end of the line-section being protected, each of said relaying means including a phase-directional element having back-contacts and a movable member associated therewith, yieldable biasing means tending to move said movable element so as to open said back-contacts, means for developing a voltage-restraint torque responsive to phase-to-phase line-voltages of the transmission-line, said voltage-restraint torque being in such direction as to tend to hold the movable element against the back-contacts, and means for developing a phase-to-phase power-directional torque which tends to open the back-contacts in response to phase-to-phase fault-current-flow in a predetermined direction in the protected line-section, each of said relaying means further including phase-to-phase fault-responsive means responsive to the actual presence of a phase-to-phase fault on the transmission-line, in combination with a communicating channel between the two ends of the line-section being protected, a transmitter means capable of transmitting an effective signal to said communicating channel, a receiver relay capable of receiving and responding to said signal, transmitter-controlling means, responsive to the opening of said back-contacts of said phase-directional element, for controlling said signal-transmitting means, and circuit-interrupter-controlling means at each end, responsive both to said receiver means and to an indication of a transmission-line fault, for energizing a control-circuit for the circuit-interrupter at that end.

43. Protective means for a line-section of a transmission-line, comprising a phase-directional relay element having back-contacts and a movable member associated therewith, yieldable biasing means tending to move said movable element so as to open said back-contacts, means for developing a voltage-restraint torque responsive to phase-to-phase line-voltages of the transmission line, said voltage-restraint torque being in such direction as to tend to hold the movable element against the back-contacts, and means for developing a phase-to-phase power-directional torque which tends to open the back-contacts in response to phase-to-phase current-flow in a predetermined direction in the protected line-section.

44. Protective equipment for a line-section of a transmission-line, comprising line-sectionalizing circuit-interrupter means and relaying means at each end of the line-section being protected, each of said relaying means including phase-relay means for securing a directional response to phase-fault-current power-flow in a predetermined direction in the protected line-section and also a response to a voltage-change indicative of the presence of a phase-fault on the transmission-line without the accompaniment of corresponding current-flow of fault-magnitude, means associated with said phase-relay means for preventing an effectual response to said phase-fault-indicative voltage-change, in response to the actual presence of a ground-fault on the transmission-line, each of said relaying means also including ground-relay means for securing a directional response to ground-fault-current power-flow in a predetermined direction in the protected line-section and also a response to a voltage-change indicative of the presence of a ground-fault on the transmission-line without the accompaniment of corresponding current-flow of fault-magnitude, means for providing an intelligence-communicating channel between the two ends of the protected line-section, auxiliary means associated with said intelligence-communicating channel for selectively cooperating with the aforesaid responses of said relaying means at the two ends of the protected line-section so as to provide a trip-circuit indication, and trip-circuit means, at each end, for actuating the circuit-interrupter means at its end of the protected line-section in response to said trip-circuit indication.

45. Protective equipment for a line-section of a transmission-line, comprising a phase-directional relay element having a yieldable actuating biasing means tending to actuate the relay, electromagnetic restraint-means for developing a restraining torque tending to restrain the actuation of the relay, means for developing a phase-to-phase power-directional torque which tends to actuate the relay in response to phase-to-phase fault-current-flow in a predetermined direction in the protected line-section, and transmission-line-current-responsive means for quickly reducing the torque exerted by said electromagnetic restraint-means.

WILLIAM A. LEWIS.